United States Patent
Chandrashekar et al.

(10) Patent No.: US 8,811,675 B2
(45) Date of Patent: Aug. 19, 2014

(54) CIRCULAR OBJECT IDENTIFICATION SYSTEM

(75) Inventors: Puneeth Bilagunda Chandrashekar, Bangalore (IN); Sharmila Saha, Bangalore (IN)

(73) Assignee: Mindtree Limited, Bangalore, Karnataka (IN)

( * ) Notice: Subject to any disclaimer, the term of this patent is extended or adjusted under 35 U.S.C. 154(b) by 181 days.

(21) Appl. No.: 13/473,624

(22) Filed: May 17, 2012

(65) Prior Publication Data

US 2013/0259386 A1 Oct. 3, 2013

(30) Foreign Application Priority Data

Mar. 30, 2012 (IN) ............................ 1276/CHE/2012

(51) Int. Cl.
*G06K 9/46* (2006.01)
*G06K 9/62* (2006.01)

(52) U.S. Cl.
USPC ............ 382/104; 382/173; 382/203; 382/263

(58) Field of Classification Search
CPC ............................................... G06K 2009/485
See application file for complete search history.

(56) References Cited

U.S. PATENT DOCUMENTS

| | | | |
|---|---|---|---|
| 5,434,937 A | 7/1995 | Glance | |
| 5,761,326 A | 6/1998 | Brady et al. | |
| 5,821,879 A | 10/1998 | Liepmann | |
| 6,021,222 A | 2/2000 | Yamagata | |
| 6,859,555 B1 | 2/2005 | Fang et al. | |
| 7,773,773 B2 | 8/2010 | Abercrombie et al. | |
| 8,363,945 B2 * | 1/2013 | Hu | 382/181 |
| 2005/0259891 A1 * | 11/2005 | Sendai | 382/294 |
| 2009/0016583 A1 | 1/2009 | Wolf et al. | |
| 2009/0304285 A1 | 12/2009 | Wu et al. | |
| 2010/0027892 A1 | 2/2010 | Guan et al. | |
| 2011/0249869 A1 * | 10/2011 | Stoeffler et al. | 382/104 |
| 2012/0155724 A1 * | 6/2012 | Kitamura et al. | 382/128 |

FOREIGN PATENT DOCUMENTS

WO WO2010076668 A1 7/2010

OTHER PUBLICATIONS

Carolyn Kimme at al., "Finding Circles by an Array of Accumulators", ACM publication, Short Communications, Graphics and image Processing, 1975, pp. 120-122.*

Ali Ajdari Rad et al., "Fast Circle Detection Using Gradient Pair Vectors", Proc. VIIth Digital Image Computing: Techniques and Applications, Dec. 2003, Sydney, pp. 879-887.*

(Continued)

*Primary Examiner* — Brian P Werner
(74) *Attorney, Agent, or Firm* — Ash Tankha; Lipton, Weinberger & Husick

(57) ABSTRACT

A computer implemented method and system determines a center point of a circular object in an image. A circular object identification system identifies prospective center points of the circular object for each of multiple pixel points at a predetermined distance along a gradient direction determined for each of the pixel points, constructs an axis between the corresponding prospective center points and a corresponding pixel point, and locates prospective circumference points at predetermined angles from the constructed axis. The circular object identification system compares the gradient direction of each of the prospective circumference points with a direction defined by each of the prospective circumference points and a corresponding prospective center point to find a match, determines convergence of the gradient direction of each of the prospective circumference points to a corresponding prospective center point, and determines the center point based on resultant decision votes of each of the prospective center points.

41 Claims, 23 Drawing Sheets

(56) References Cited

OTHER PUBLICATIONS

Rad et al., Fast Circle Detection Using Gradient Pair Vectors, Digital Image Computing, Proc. VIIth, Dec. 10-12, 2003, Sydney.

Yonghong Xie and Qiang Ji, A new efficient ellipse detection method, Proc. of International Conference on Pattern recognition, 2002, pp. II: 957-960.

Idaho Department of Transportation, Traffic Surveillance by Wireless Sensor Networks.

Surendra Gupte, Osama Masoud, Robert F.K. Martin, Nikolaos P. Papanikolopoulos, Detection and Classification of Vehicles, IEEE Transactions on Intelligent Transportation Systems, Mar. 2002, vol. 3, No. 1.

Image Processing Application in Toll Collection, IAENG International Journal of Computer Science, 32:4, IJCS_32_4_15.

Lappeenranta University of Technology, Randomised Hough Transform.

James F. Frenzel, University of Idaho (prepared for Idaho department of transportation), A video-based method for the detection of truck axles, Final Report, Oct. 2002.

* cited by examiner

FIG. 8A

CIRCULAR OBJECT IDENTIFICATION SYSTEM

CROSS REFERENCE TO RELATED APPLICATIONS

This application claims the benefit of non-provisional patent application number 1276/CHE/2012 titled "Circular Object Identification System", filed on Mar. 30, 2012 in the Indian Patent Office.

The specification of the above referenced non-provisional patent application is incorporated herein by reference in its entirety.

BACKGROUND

The computer implemented method and system disclosed herein, in general, relates to an object identification system. More particularly, the computer implemented method and system disclosed herein relates to identification of circular objects in an image.

The identification of circular objects in images has conventionally been carried out using a circular Hough transform (CHT) on binary images. The circular Hough transform is a specialized type of a conventional Hough transform for identifying circular objects in an image. A conventional Hough transform relies on the detection of edges in the image. Therefore, the efficiency of the Hough transform is dependent on the accuracy of detection of the edges in an image. Conventional Hough transform (HT) based techniques typically consider edges in the image and accumulate votes only in locations which provide good contrast in order to avoid false detections. However, for low contrast images, the HT based techniques are often not effective for identifying circular objects since the images are hard to binarize through edge detection in low contrast images. Consider an example of an image of a vehicle tire. The efficiency of the Hough transform is reduced in this case since vehicle tires typically do not have a good contrast with respect to a road on which they are driven, particularly during night time or in dimly lit areas, and the vehicle tires are less likely to stand out in an edge detected image.

Furthermore, in a noisy image of a real circular object, the method of accumulation of votes at the center point of the circular object as suggested by the Hough transform triggers false peaks at low contrast locations in the image. To override this problem, some techniques for identifying circular objects in an image employ gradients in gray scale images to accumulate votes in an accumulator, as in the standard Hough transform. However, these techniques are constrained by the complexity of features in a natural image and often record a lot of peaks and false detections.

Furthermore, the methods for identifying circular objects in an image based on the conventional Hough transform typically resort to obtaining gradients at each of the points on the circular object during processing of a low contrast image. However, in the case of low contrast images, the direction of the gradient at a particular pixel point, that is, whether the gradient points inward or outward, cannot be directly determined. For example, if the radius of the circular object is R, conventional HT based algorithms increment the accumulator at a distance of R in either of the directions resulting in a large number of votes in the accumulator at the center point of the circular object and a relatively small number of votes at a distance of 2R from the center point. Therefore, since the direction along which the actual center point of the circular object is located is not definitive, methods using this algorithm accumulate votes along both the inward and outward directions to include all possibilities, thereby resulting in false detections. Furthermore, in a low contrast noisy image of a real object, there is a possibility of accumulation of votes even at points that do not qualify as the center point of the circular object. For example, the votes contributed by noisy pixels points in a low contrast image result in the generation of a false peak at a low contrast location in the image. This leads to a possibility that the method may fail to identify the actual circular objects, for example, vehicle tires, in the image.

Another method for identifying circular objects in the image comprises the use of edge magnitude based algorithms that are based on determination of the difference in the gradient magnitude between the pixel points in an image. However, methods using conventional edge magnitude based algorithms for identification of circular objects are also not effective for low contrast images since the gradient magnitude difference between the pixel points in the image is low. Another method for identifying circular objects in the image is restricted to verifying the convergence of gradient directions of all the pixel points in the image to a particular pixel point that is a prospective center point of the circular object in the image. However, this method is not effective for low contrast images due to the ambiguity resulting from the intersection of multiple gradient directions of all the pixel points throughout the image.

Another method for identifying circular objects in low contrast images comprises using symmetric gradient pair vectors at diametrically opposing points. This method identifies candidate circles for each pair of gradient vectors with the center point of a candidate circle equal to the midpoint of the line connecting the pair of gradient vectors, and accumulates votes for each of the candidate circles. Although this method is directed at improving the speed of identification of circular objects in the image, the method is constrained by a mandatory requirement that the circular object be completely visible in the image. Moreover, this method is limited by an inability to identify semi-circular objects, arcuate objects, occluded objects, etc. Furthermore, this method is constrained by a limited ability to search and locate the diametrically opposing points for a non-rigid circular object such as a vehicle tire, which leads to multiple false detections.

Furthermore, consider a practical application where identification of circular objects in an image can be used to perform classification of vehicles based on the identification of vehicle tires in real time. Conventionally, induction loop systems have been used for identifying the characteristics of vehicles and classifying the vehicles based on the identified characteristics. Induction loop systems require the installation of an insulated, electrically conducting loop under the road for detection of vehicles. The cost of installation of induction loop systems is substantially higher since induction loop systems demand the use of multiple sensitive sensors in a single location. Moreover, induction loop systems need appropriate mounting locations for installation and need to be installed each time a road is repaved. Induction loop systems need constant supervision and repair, further increasing the time and cost of maintenance, and also require a lot of ground work on a periodic basis. Therefore, there is a need for a non-intrusive technology such as an image processing technology that imposes lesser hardware constraints, and provides the flexibility of performing identification and classification of vehicles in real time.

Conventional image processing technologies typically employ image sensors and imaging based object detection, herein referred to as "vision based methods". The vision based methods analyze the images by extracting features from the image, that is, a set of predetermined shapes and points that characterize a specific aspect of the object. In an example, the tires of the vehicle that characterize the vehicle can be identified by the image sensors and analyzed for classifying the vehicle. However, conventional vision based methods often add to the complexity and computing power needed for detection of an object in an image. Moreover, conventional vision based methods have often been found sensitive to changing light conditions and consequently are ill-equipped to process low contrast images. Furthermore, since conventional vision based methods are reliant on precise positioning of image sensors, the efficiency of these vision based methods is reduced when detecting occluded objects in the image.

Hence, there is a long felt but unresolved need for a computer implemented method and system that optimally determines a center point of a circular object and identifies one or more circular objects in a low contrast image. Moreover, there is a need for a faster, efficient computer implemented method and system that reduces the number of computations required for identifying a circular object in an image by accumulating votes only at valid center points in the image. Furthermore, there is a need for an optimal computer implemented method and system that identifies a circular object in a low contrast image and enables a faster identification of vehicle tires and subsequent classification of the vehicle based on the characteristics of the vehicle tires.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above mentioned needs for optimally determining a center point of a circular object and identifying one or more circular objects in a low contrast image. Moreover, the computer implemented method and system disclosed herein reduces the number of computations required for identifying a circular object in an image by accumulating votes only at valid center points in the image. Furthermore, the computer implemented method and system disclosed herein optimally identifies a circular object, for example, a vehicle tire, in a low contrast image and enables a faster identification of vehicle tires and subsequent classification of the vehicle based on the identification of the characteristics of the vehicle tires. For example, the size of the tire of a vehicle can be used to perform a quick and coarse classification of vehicles into small, medium and large. A finer classification of the vehicle can be performed using the characteristics of the vehicle. Once the coarse classification is performed based on the vehicle tires, it becomes easier to perform a finer classification based on other features of the image, since the data set for each of the classes of vehicles reduces considerably, thereby increasing the efficiency of the overall system.

The computer implemented method and system disclosed herein determines a center point of a circular object in an image. As used herein, the term "circular object" refers to an object in an image with the properties of a circle, that is, an object defined by a center point and a fixed radius. The circular object is, for example, an object in the shape of a circle such as a vehicle tire, a semi-circular object, an arcuate object, etc. The computer implemented method disclosed herein employs a computer system comprising at least one processor communicatively coupled to a non-transitory computer readable storage medium that stores instructions executable by the processor, where the processor is configured to implement the method disclosed herein. The computer implemented system disclosed herein referred to as a "circular object identification system", determines a gradient direction for each of multiple pixel points in the image. The gradient direction defines an angular orientation related to a change in intensity at each of the pixel points with respect to a reference axis. The angular orientation is obtained as an arctangent (arctan) of the ratio of the change in intensity along the Y direction to the change in intensity along the X direction at each of the pixel points. The circular object identification system identifies prospective center points of the circular object for each of the pixel points at a predetermined distance along the gradient direction of each of the corresponding pixel points. Since the gradient direction can be oriented inward or outward, the circular object identification system, for example, identifies two prospective center points for each circular object. The predetermined distance is, for example, the radius of the circular object. In an embodiment, the circular object identification system selects the predetermined distance for identifying the prospective center points of the circular object for each of the pixel points from multiple radius ranges defined for the circular object.

The circular object identification system constructs an axis that joins corresponding prospective center points and a corresponding pixel point. The circular object identification system then locates prospective circumference points among the pixel points at predetermined angles from the constructed axis for a corresponding pixel point. The prospective circumference points are at the predetermined distance, that is, the radius length, from a corresponding prospective center point. In an embodiment, the circular object identification system compares the gradient direction of each of the prospective circumference points with a direction defined by each of the prospective circumference points and a corresponding prospective center point, with respect to the reference axis, to find a match. The circular object identification system determines convergence of the gradient direction of each of the prospective circumference points to a corresponding prospective center point on finding the match, for establishing that each of the prospective circumference points lies on a circumference of the circular object. In an embodiment, the circular object identification system traverses the predetermined distance from each of the prospective circumference points to reach a corresponding prospective center point for determining convergence of the gradient directions of the prospective circumference points to the corresponding prospective center point.

The circular object identification system assigns a decision vote to a corresponding prospective center point based on the determination of convergence of the gradient directions of one or more of the prospective circumference points to the corresponding prospective center point. As used herein, the term "decision votes" refers to votes used for conclusively identifying the center point of the circular object. The circular object identification system determines number of resultant decision votes assigned to each of the prospective center points identified for each of the pixel points in the image by counting each decision vote assigned to each of the prospective center points. The circular object identification system determines the center point of the circular object from the prospective center points identified for the pixel points in the image based on the determined number of resultant decision votes assigned to each of the prospective center points. In an embodiment, the circular object identification system determines the center point of the circular object from one of the prospective center points with the highest number of resultant decision votes. In another embodiment, the circular object identification system determines the center point of the circular object from one of the prospective center points when a weighted average of the resultant decision votes assigned to that prospective center point is greater than a predetermined threshold. In an embodiment, the circular object identification system sets a center threshold for the number of resultant decision votes that qualifies one of the prospective center points as the center point of the circular object.

The circular object identification system stores each decision vote assigned to a corresponding prospective center point for each of the pixel points in an accumulator array. As used herein, the term "accumulator array" refers to an array of cells, where each of the cells marks a spatial location of a prospective center point in the image, and is configured to store decision votes assigned to the prospective center point. In an embodiment, the circular object identification system identifies a first local neighborhood of pixel points around each of the prospective center points. The circular object identification system identifies a second local neighborhood of pixel points around each of the prospective circumference points.

In an embodiment, the circular object identification system compares the gradient direction of each of the prospective circumference points and each of the pixel points in the second local neighborhood, with a direction defined by each of the prospective circumference points and each of the pixel points in the second local neighborhood with a corresponding prospective center point, with respect to the reference axis, to find a match. On finding a match, the circular object identification system determines convergence of the gradient direction of each of the matched prospective circumference points and each of the pixel points in the second local neighborhood to a corresponding prospective center point or any of the pixel points in the first local neighborhood around the corresponding prospective center point, by traversing the predetermined distance from each of the prospective circumference points and each of the pixel points in the second local neighborhood to reach the corresponding prospective center point or any of the pixel points in the first local neighborhood.

The circular object identification system then assigns a local vote to a corresponding prospective center point based on each determination of the convergence of the gradient directions of one or more of the prospective circumference points and the pixel points in the second local neighborhood to a corresponding prospective center point or any of the pixel points in the first local neighborhood. As used herein, the term "local vote" refers to a vote assigned to a prospective center point when the gradient direction of either a prospective circumference point located at a predetermined distance from that prospective center point or a pixel point in the second local neighborhood of that prospective circumference point converges to the prospective center point or to any pixel point in the first local neighborhood of that prospective center point.

The circular object identification system adds the decision vote to the corresponding prospective center point in the accumulator array when the number of resultant local votes assigned to the corresponding prospective center point determined by counting each local vote assigned to the corresponding prospective center point is greater than a predetermined vote count threshold. In an embodiment, the circular object identification system adds the decision vote to each of the corresponding prospective center points in the accumulator array, when the resultant local votes assigned to each of the corresponding prospective center points are equal. In another embodiment, the circular object identification system adds the decision vote to one of the corresponding prospective center points in the accumulator array, when the resultant local votes assigned to one of the corresponding prospective center points are greater than the resultant local votes assigned to the other corresponding prospective center point.

In an embodiment, after determination of the center point for identifying a circular object in the image, the circular object identification system identifies each of the pixel points at the predetermined distance from the determined center point, that contributes each decision vote to the determined center point of the circular object. The circular object identification system determines an angle range that defines a curvature and a magnitude of the circular object, for example, by generating an angle histogram of the identified pixel points. As used herein, the term "angle range" refers to a range of angles within which pixel points in the image contribute a non-zero number of local votes to the center point of the circular object. The curvature of the circular object, for example, determines the type of the circular object based on the angle range. For determining the angle range, the circular object identification system determines the number of local votes contributed by each of the identified pixel points to the determined center point. The circular object identification system then maps the number of local votes contributed by each of the identified pixel points to a predetermined angle measure. As used herein, the term "predetermined angle measure" refers to an angle between a line segment that connects a center point of a circular object to a pixel point on the circumference of the circular object and a reference axis. The circular object identification system determines the angle range using each predetermined angle measure with a non-zero number of local votes. The circular object identification system correlates the resultant decision votes assigned to the determined center point of the circular object with the angle range determined from the angle histogram for identifying the circular object in the image. The circular object identification system compares an average number of local votes for the angle range with a predetermined angle threshold for validating the circular object in the image.

In an embodiment, the circular object identification system determines a number of pixel points associated with each of an upper surface and a lower surface of the circular object in the image. The circular object identification system compares the number of pixel points associated with the upper surface of the circular object with the number of pixel points associated with the lower surface of the circular object for identifying the type of the circular object. In an embodiment, the circular object identification system determines characteristics of a first circular object and one or more second circular objects associated with the first circular object to classify a device, for example, a vehicle, associated with the first circular object and the second circular objects in the image. The characteristics of the first circular object and the second circular objects comprise, for example, one or more of a radius of each of the first circular object and the second circular objects, the number of second circular objects, a distance between the first circular object and each of the second circular objects, etc.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 8A exemplarily illustrates an array showing the number of local votes that are mapped to each of the pixel points at a predetermined angle measure and at a predetermined distance from the center point of a circular object in the image for generation of an angle histogram by the circular object identification system for identifying the circular object.

DETAILED DESCRIPTION OF THE INVENTION

Figure 1:
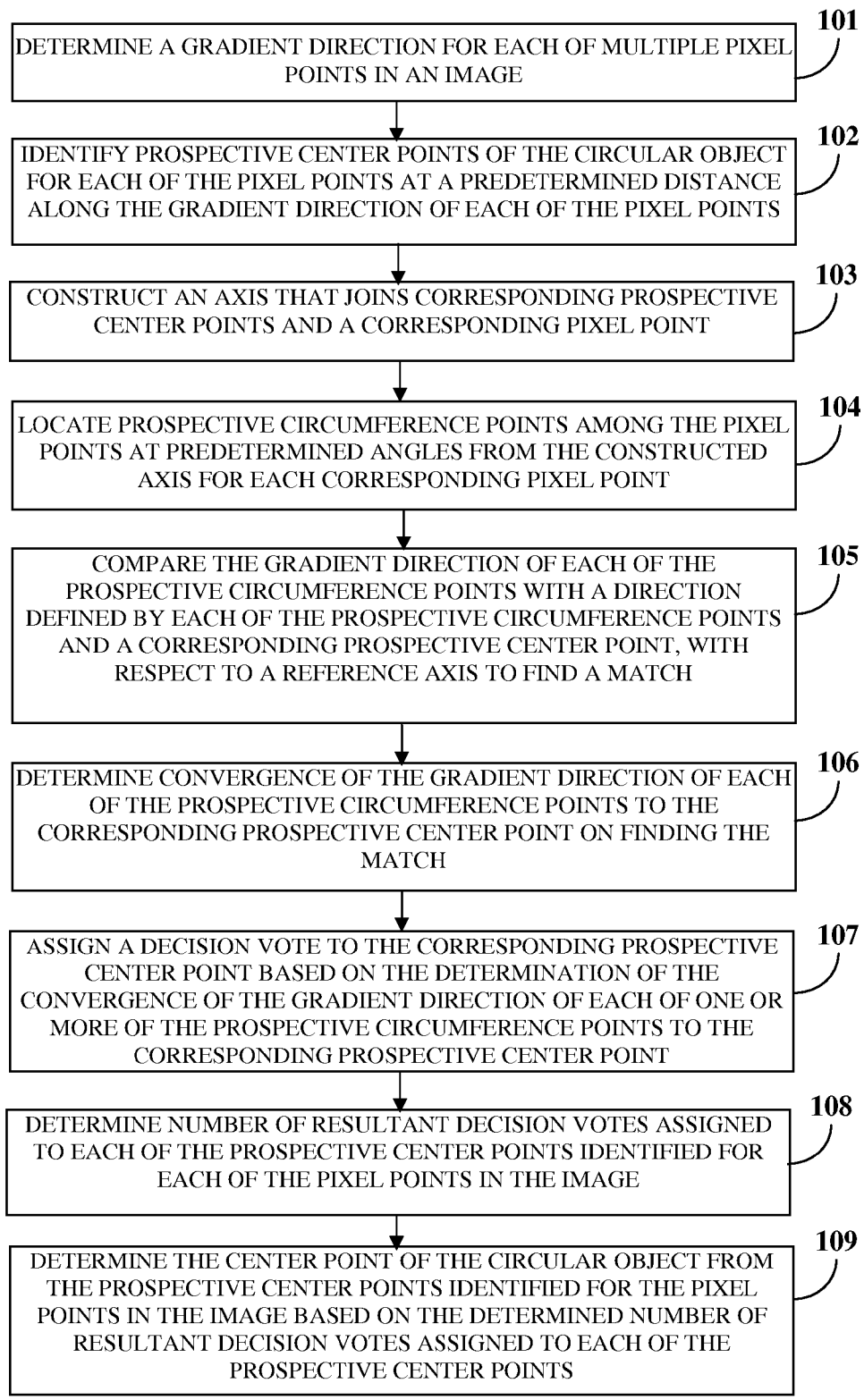
FIG. 1 illustrates a computer implemented method for determining a center point of a circular object in an image.

FIG. 1 illustrates a computer implemented method for determining a center point of a circular object in an image. The computer implemented method disclosed herein employs a computer system 1300, as exemplarily illustrated in FIG. 13, comprising at least one processor 1301 communicatively coupled to a non-transitory computer readable storage medium that stores instructions executable by the processor 1301, where the processor 1301 is configured to implement the method disclosed herein. The computer implemented method disclosed herein provides a circular object identification system for processing an image and identifying one or more circular objects in the image. As used herein, the term "circular object" refers to an object in an image with the properties of a circle, that is, an object defined by a center point and a fixed radius. The circular object is, for example, an object in the shape of a circle such as a vehicle tire, a semicircular object, an arcuate object, etc. The circular object identification system acquires an image and processes the image to obtain a spatial representation of the image comprising multiple pixel points. Each pixel point is a measure of the intensity of light at a particular location and is defined by coordinates of the location. The circular object identification system determines 101 a gradient direction for each of the pixel points in the image. The gradient direction defines an angular orientation related to a change in intensity at each of the pixel points with respect to a reference axis. The angular orientation is obtained as an arctangent (arctan) of the ratio of the change in intensity along the Y direction to the change in intensity along the X direction at each of the pixel points. The gradient directions are derived, for example, with respect to a horizontal reference axis, referenced by an axis GI as exemplarily illustrated in FIG. 5.

The change in intensity of light at each of the pixel points in the image is represented by an image intensity function I. The circular object identification system filters the image by convolving an image with the image intensity function I with a 3×3 Sobel kernel to obtain partial derivative approximations of the image intensity function I with respect to the pixel points in the image represented by the variables X and Y, along an X direction and a Y direction defined according to a Cartesian coordinate system, as indicated below:

$$\frac{dI}{dy} = \begin{bmatrix} -1 & -2 & -1 \\ 0 & 0 & 0 \\ +1 & +2 & +1 \end{bmatrix} * Img$$

$$\frac{dI}{dx} = \begin{bmatrix} -1 & 0 & +1 \\ -2 & 0 & +2 \\ -1 & 0 & +1 \end{bmatrix} * Img$$

The angular orientation using the Sobel filter in this example is obtained as arctan((dI/dy)/(dI/dx)). The computer implemented method disclosed herein uses, for example, a Sobel filter because the Sobel filter provides both high pass and low pass filter characteristics in a single kernel. Consider an example of a pixel point A in an image as exemplarily illustrated in FIG. 4. The pixel point A is an arbitrary pixel point in the image, not necessarily lying on the circumference of the circular object. In this example, the pixel point A lies on the circumference of the circular object; however, the steps for determining the gradient direction and subsequent processing are similar for other pixel points in the image. The gradient direction for this pixel point A, derived using the Sobel filter, is exemplarily illustrated in FIG. 4.

In another example, for obtaining the gradient directions of the pixel points in the image, the circular object identification system calculates, for example, the second partial derivatives of the first partial derivatives dI/dx and dI/dy or a square of the partial derivatives of the pixel points of the image from the partial derivatives dI/dx and dI/dy, with respect to the variables X and Y. The circular object identification system enters the calculated second partial derivatives or the square of the partial derivatives of the image intensity function I in a Hessian matrix. The Hessian matrix is a square matrix of second order partial derivatives of a function and describes a local curvature of a function of many variables. The circular object identification system computes a set of eigen values and eigen vectors from the Hessian matrix that characterize the image intensity function, and selects a dominant eigen value and a dominant eigen vector from the set of eigen values and eigen vectors. The circular object identification system obtains a direction of the dominant eigen value as the gradient direction of the image intensity function at a particular pixel point.

Figure 4:
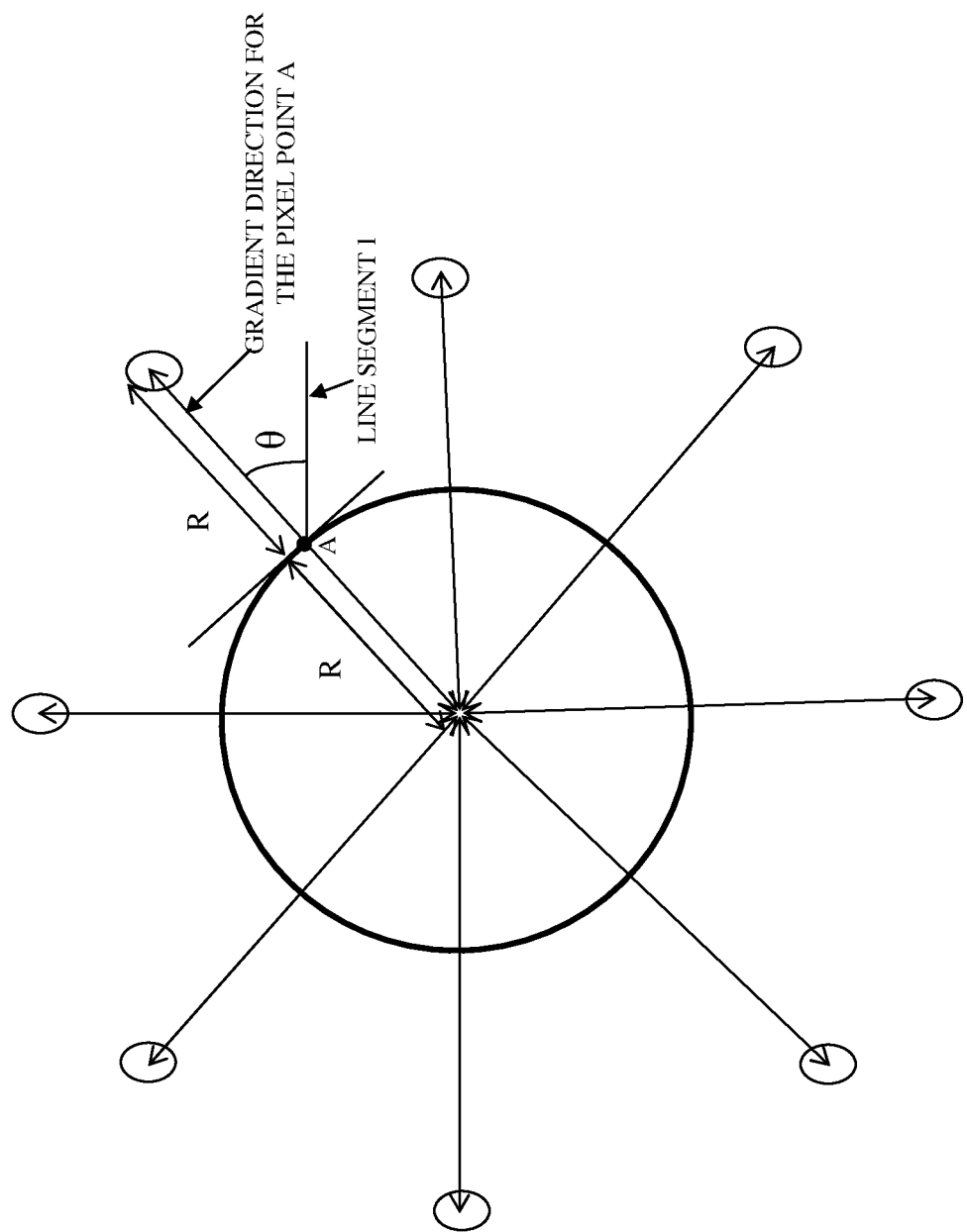
FIG. 4 exemplarily illustrates a circular object, showing a representation of gradient directions determined for a few of the pixel points associated with the circular object.

The gradient directions of some of the pixel points in the image are exemplarily illustrated in FIG. 4. Consider an example where the image is a low contrast image. The gradient directions do not specify whether they point inside or outside the circular object. Therefore, the circular object identification system determines the actual center point of the circular object from among the prospective center points identified along the gradient direction pointing inside and outside the circular object, at a predetermined radius defined for the circular object. If the predetermined radius of the circular object is R, incrementing an accumulator array at a distance of R from each of the pixel points in either direction results in a large number of decision votes at the actual center point of the circular object and a substantially lesser number of decision votes at a distance of 2R from the actual center point of the circular object. As used herein, the term "accumulator array" refers to an array of cells, where each of the cells marks a spatial location of a prospective center point in the image, and is configured to store decision votes assigned to the prospective center point. Also, as used herein, the term "decision votes" refers to votes used for conclusively identifying the center point of the circular object.

In an embodiment, the circular object identification system constructs a gradient direction image. The gradient direction image is an image comprising gradient directions of each of the pixel points at their corresponding locations. The gradient direction image is of the same size as the original image. The circular object identification system is configured to address the tradeoff between different methods of representing the gradient directions in the gradient direction image. For example, the gradient directions can be represented in terms of X-Y coordinates of the Cartesian coordinate system, or can be represented in terms of angles from a fixed axis according to a polar coordinate system. A representation of the gradient direction according to the Cartesian coordinate system is memory intensive but requires no additional mathematical computations. A representation of the gradient direction according to the polar coordinate system reduces memory requirements, but is computationally intensive since the coordinates of the pixel point need to be derived from the angles, and this necessitates a greater number of processing clock cycles. For example, consider a pixel point having a gradient direction of 45°. The gradient direction image can store the gradient direction information as a gradient angle value [45°] or as a vector, that is, as [cos(45°), sin(45°)]. However, when storing the gradient direction information as a gradient angle value, the circular object identification system needs to perform additional cosine and sine operations on the gradient angle to obtain the vector, thereby adding to the number of computations.

The circular object identification system identifies 102 prospective center points of the circular object for each of the pixel points at a predetermined distance along the gradient direction of each of the pixel points. The predetermined distance is, for example, a predetermined radius of the circular object. In an embodiment, the circular object identification system selects the predetermined distance for identifying the prospective center points of the circular object for each of the pixel points from multiple radius ranges defined for the circular object. The circular object identification system first selects a predetermined radius from one of the radius ranges and uses the selected radius for verifying whether a valid circular object exists in the image with the selected radius. If the circular object identification system determines that a valid circular object having the selected radius is not found, then the circular object identification system sequentially increments the predetermined radius within a particular radius range defined for the circular object and verifies whether a valid circular object exists in the image for each incremented radius, until a valid circular object has been identified at one or more of the radii in the radius range. Consider an example where the circular object is a vehicle tire. Since the size of the vehicle tire is characterized by the radius of the vehicle tire, the circular object identification system classifies vehicles into heavy vehicles, light vehicles, etc., based on the radius of the circular object, that is, the vehicle tire in the image. Therefore, the circular object identification system identifies the prospective center points of the circular objects for different radius ranges corresponding, for example, to a truck, a car, a bicycle, etc.

Since the gradient direction for a particular angular orientation can extend from a pixel point in two possible directions, that is, an inward direction and an outward direction, the circular object identification system identifies two prospective center points with reference to each pixel point in the image. Consider the pixel point A exemplarily illustrated in FIG. 5. The circular object identification system moves a predetermined distance R equal to the radius of the circular object along the gradient direction of the pixel point A represented by the line 1 and identifies the pixel points G and D as the prospective center points. The circular object identification system constructs 103 an axis that joins corresponding prospective center points and a corresponding pixel point. For example, the circular object identification system constructs an axis that joins the prospective center point G, the prospective center point D, and the pixel point A as exemplarily illustrated in FIG. 5. Therefore, the axis is along the gradient direction of the pixel point A.

The circular object identification system locates 104 prospective circumference points among the pixel points in the image at predetermined angles from the constructed axis for each corresponding pixel point. The prospective circumference points are at the predetermined distance from a corresponding prospective center point. Consider an example where the predetermined angle is $\theta$ with respect to a reference axis GI as exemplarily illustrated in FIG. 5. The circular object identification system locates the prospective circumference points B and C at an angle $\theta$ from the prospective center point G at a radius R, and the prospective circumference points E and F at the angle $\theta$ from the prospective center point D at the radius R as exemplarily illustrated in FIG. 5. Considering only the magnitude of the predetermined angle $\theta$, the predetermined angle $\theta$ is an angle, for example, between about 0 degrees and 90 degrees with respect to the reference axis. A small angle allows the circular object identification system to accurately identify arcuate objects, since the prospective circumference points are accommodated within a small angle with respect to a reference axis for an arcuate shaped object.

The circular object identification system compares 105 the gradient direction of each of the prospective circumference points with a direction defined by each of the prospective circumference points and a corresponding prospective center point, with respect to the reference axis to find a match. For example, as exemplarily illustrated in FIG. 5, the circular object identification system compares the gradient direction of each of the prospective circumference points B and C with a direction defined by each of the prospective circumference points B and C respectively, and the corresponding prospective center point G, with respect to the reference axis GI to find a match, and also compares the gradient direction of each of the prospective circumference points E and F with a direction defined by each of the prospective circumference points E and F respectively, and the corresponding prospective center point D, with respect to the reference axis GI to find a match. The direction defined by a prospective circumference point and a prospective center point is along the line segment connecting the prospective circumference point and the prospective center point. As used herein, the term "match" refers to the extent of correlation between the gradient direction of a prospective circumference point, and the direction defined by the prospective circumference point and the corresponding prospective center point within a predetermined angle margin.

Figure 5:
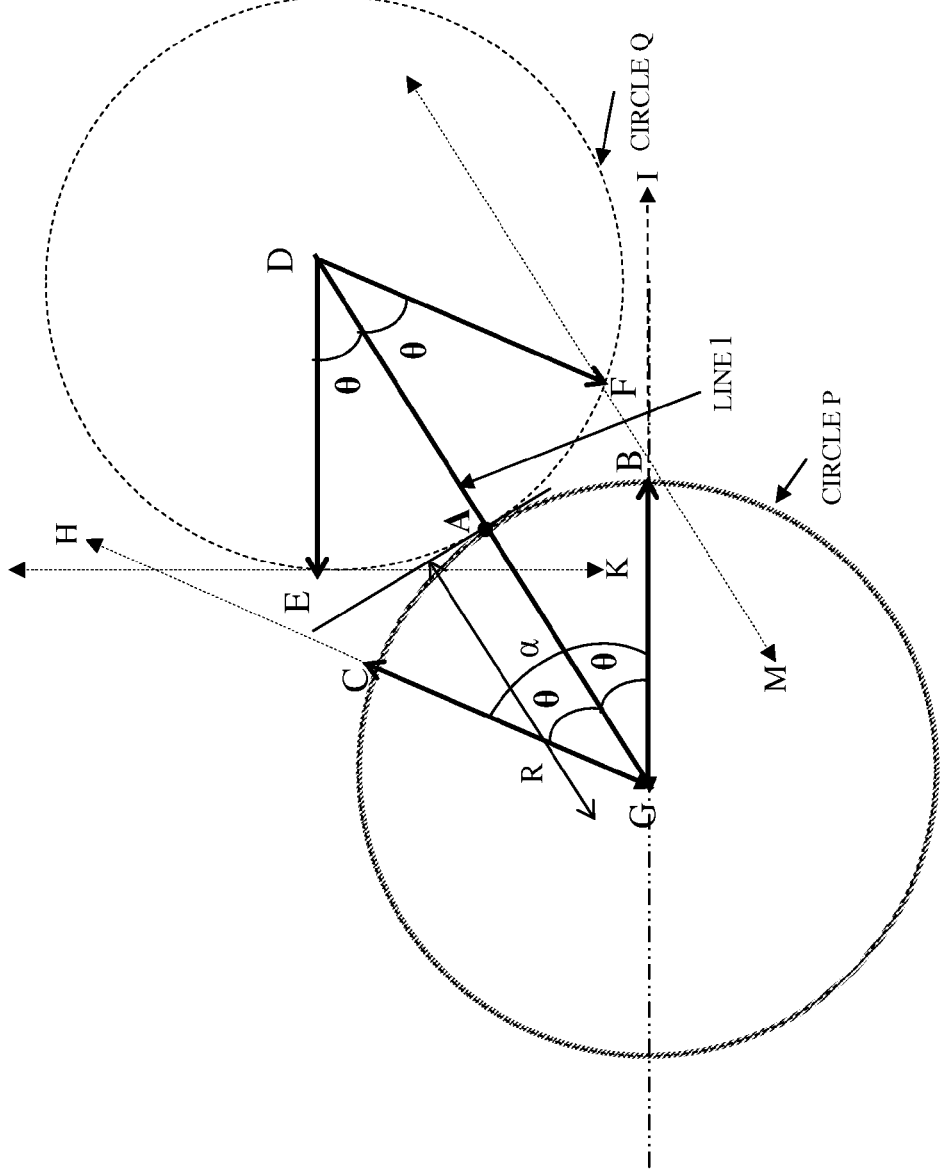
FIG. 5 exemplarily illustrates a method for identifying the center point of a circular object.

The circular object identification system sets the predetermined angle margin to accommodate differences between the gradient direction of each of the prospective circumference points, and the direction defined by each of the prospective circumference points and a corresponding prospective center point, which arise from the use of digital images. Consider an example where the circular object identification system sets an angle margin of +0.6 degrees to −0.6 degrees. The direction defined by a prospective circumference point B and a corresponding prospective center point G with respect to a horizontal reference axis GI exemplarily illustrated in FIG. 5, is 45 degrees. Therefore, the circular object identification system determines a match when the gradient direction of the prospective circumference point B is between 45.6 degrees and 44.4 degrees when compared with the direction defined by the prospective circumference point B and the corresponding prospective center point G, with respect to the horizontal reference axis GI.

The circular object identification system retrieves the gradient directions of the prospective circumference points, for example, from the constructed gradient direction image. The angle corresponding to the direction defined by a prospective circumference point and a corresponding prospective center point with respect to the reference axis is herein referred to as an "effective angle" for that prospective circumference point. Therefore, the circular object identification system compares the gradient direction of each of the prospective circumference points with the effective angle ($\alpha$) of each of the prospective circumference points with respect to the horizontal reference axis.

The effective angle for a corresponding prospective circumference point is derived using the predetermined angle, for example, by adding a predetermined angle $\theta$ to or subtracting the predetermined angle $\theta$ from the angle defined by the gradient direction of the first pixel point. As exemplarily illustrated in FIG. 5, the first pixel point is A, and the gradient angle of A is $\theta$. Since the predetermined angle is $\theta$ as well, the effective angle $\alpha$ for the prospective circumference point B is ($\theta-\theta$) equal to 0, which matches the gradient direction for B considered with respect to the horizontal reference axis GI. The effective angle $\alpha$ for the prospective circumference point C is ($\theta+\theta$) equal to $2\theta$, which matches the gradient direction for C with respect to the horizontal reference axis. This ensures that a common reference frame is set for the comparison. Furthermore, the gradient direction of a pixel point that lies exactly on the circumference of the circular object is perpendicular to the tangent of the circular object at the pixel point. As exemplarily illustrated in FIG. 5, the gradient direction at each of the prospective circumference points B, C, E, and F is indicated by a broken line passing through the particular prospective circumference point. As exemplarily illustrated in FIG. 5, the gradient direction at E does not match the direction DE and the gradient direction at F does not match the direction DF, while the gradient directions at the prospective circumference points C and B match the directions GC and GB respectively.

The circular object identification system determines 106 convergence of the gradient direction of each of the prospective circumference points to a corresponding prospective center point on finding the match, for establishing that each of the prospective circumference points lies on the circumference of the circular object. For example, the circular object identification system determines the convergence of the gradient directions of the pixel points B and C to the prospective center point G exemplarily illustrated in FIG. 5. The circular object identification system determines the convergence of the gradient directions of the prospective circumference points C and B, for example, by traversing a predetermined radius distance in either direction from each of the prospective circumference points C and B to reach the prospective center point of the circular object at G and along the other direction at H and I respectively. This allows the circular object identification system to confirm the association between the prospective circumference points and the prospective center point of the circular object and validate the direction and location of the prospective center point of the circular object. In the case of a digital image, the gradient directions of the prospective circumference points may be slightly offset from the direction defined by the line segment connecting the prospective circumference points and the corresponding prospective center point, due to the usage of discrete coordinates and gradient directions. To confirm that the prospective circumference points are associated with the prospective center point and are not noisy pixel points, the circular object identification system determines the convergence of the gradient directions of the prospective circumference points to the corresponding prospective center point of the circular object.

If the circular object identification system determines that the gradient directions of the prospective circumference points located with reference to a first prospective center point and the gradient directions of the prospective circumference points located with reference to a second prospective center point converge respectively to both the prospective center points, the circular object identification system increments the accumulator array at the locations of both the prospective center points. That is, the circular object identification system adds a decision vote each to both of the prospective center points. The center point of the circular object is then determined based on the total number of resultant decision votes accumulated by each of the prospective center points after considering all the pixel points in the image.

Consider an example where there are two externally tangent circular objects touching one another in an image as exemplarily illustrated in FIG. 5. Consider a pixel point A that lies at the point of contact of the two externally tangent circular objects. The circular object identification system identifies the prospective center points G and D at a predetermined distance R equal to the radius of the circular object, along the gradient direction of the pixel point A. The circular object identification system then locates the prospective circumference points C and B with respect to the prospective center point G, and the prospective circumference points E and F with respect to the prospective center point D. Each of the prospective circumference points is at a distance R from their respective prospective center points. In this example, since there are two valid circular objects in the image, the gradient direction of the prospective circumference point C and the gradient direction of the prospective circumference point B converge to the prospective center point G, while the gradient direction of the prospective circumference point E and the gradient direction of the prospective circumference point F converge to the prospective center point D. That is, since the pixel point A lies on the circumference of both the circular objects, and the associated prospective circumference points C and B, and E and F are located with respect to A and at a distance R from their respective prospective center points, the prospective circumference points C and B, and E and F lie on the circumference of either one of the circular objects. Therefore, in the case where there are two adjacent tangent circular objects touching one another in an image, considering the pixel point A, the circular object identification system adds a decision vote each to both of the prospective center points G and D, since the gradient direction of each of the prospective circumference points C and B converges to the corresponding prospective center point G, and the gradient direction of the each of the prospective circumference points E and F converges to the corresponding prospective center point D, concurrently.

The circular object identification system assigns 107 a decision vote to a corresponding prospective center point based on the determination of the convergence of the gradient direction of each of one or more of the prospective circumference points to the corresponding prospective center point. For example, the circular object identification system assigns a decision vote to the prospective center point G exemplarily illustrated in FIG. 5, on determining that the gradient direction of each of the prospective circumference points B and C converge to the prospective center point G. The decision vote conclusively identifies the center point of the circular object. The circular object identification system, for example, assigns a decision vote to the prospective center point G for every pixel point that identifies the prospective center point G as the pixel point whose associated prospective circumference points have their gradient directions converging to the prospective center point G.

In an embodiment, the circular object identification system stores each decision vote assigned to a corresponding prospective center point for each of the pixel points, in an accumulator array. The accumulator array is, for example, two-dimensional since there are two unknown parameters corresponding to the X and Y coordinates of the center point of the circular object. The accumulator array is designed as a set of cells, where each of the cells defines the coordinates of each of the pixel points in the image. The accumulator array is initially populated with zeroes since none of the pixel points are assumed to be a prospective center point. The circular object identification system accumulates the decision votes for each pixel point in a particular cell of the accumulator array whose coordinates are equal to the coordinates of the identified pixel point.

Figure 2A:
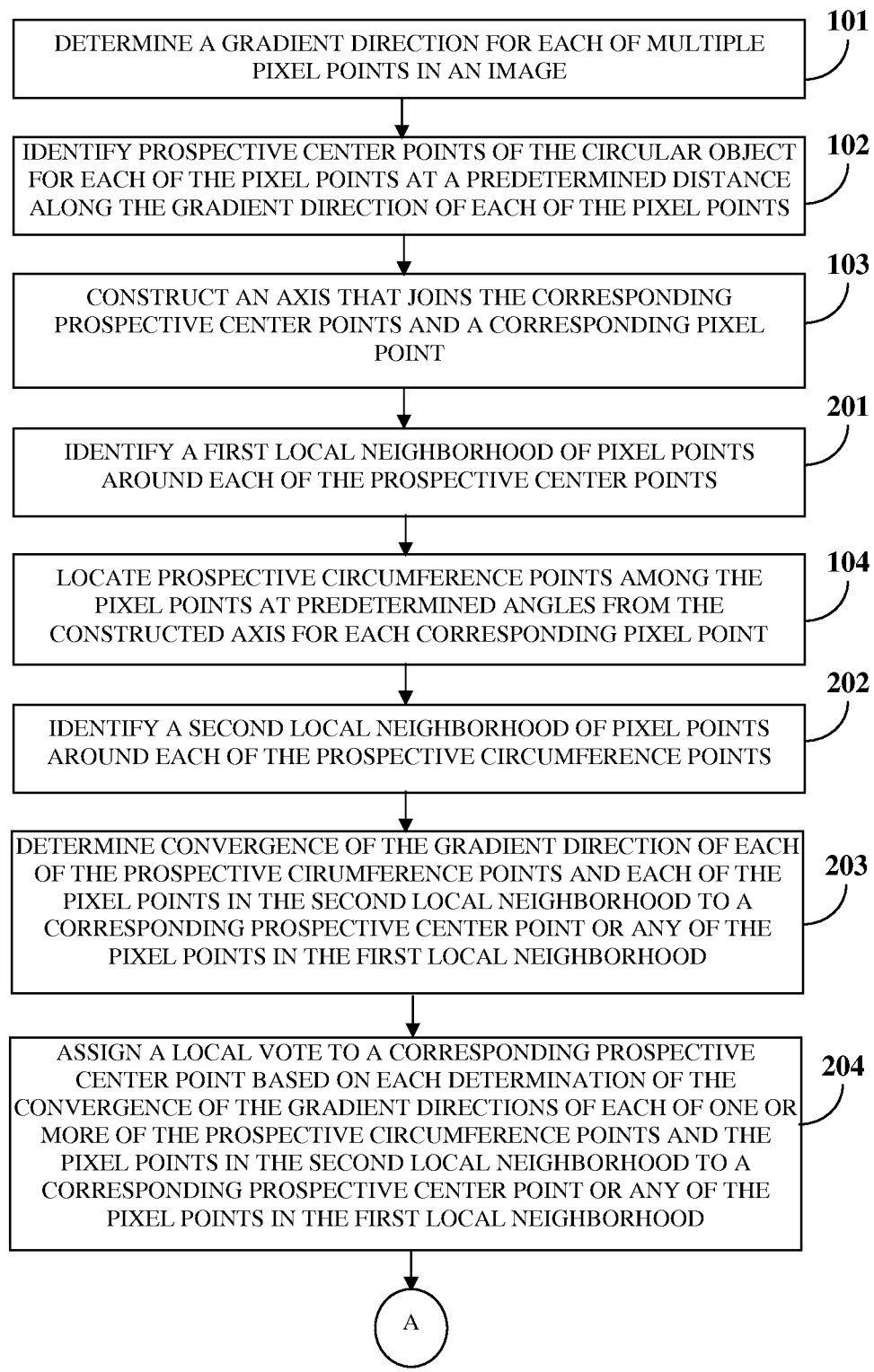
FIGS. 2A-2B illustrate an embodiment of the computer implemented method for determining the center point of a circular object in an image.
Figure 2B:
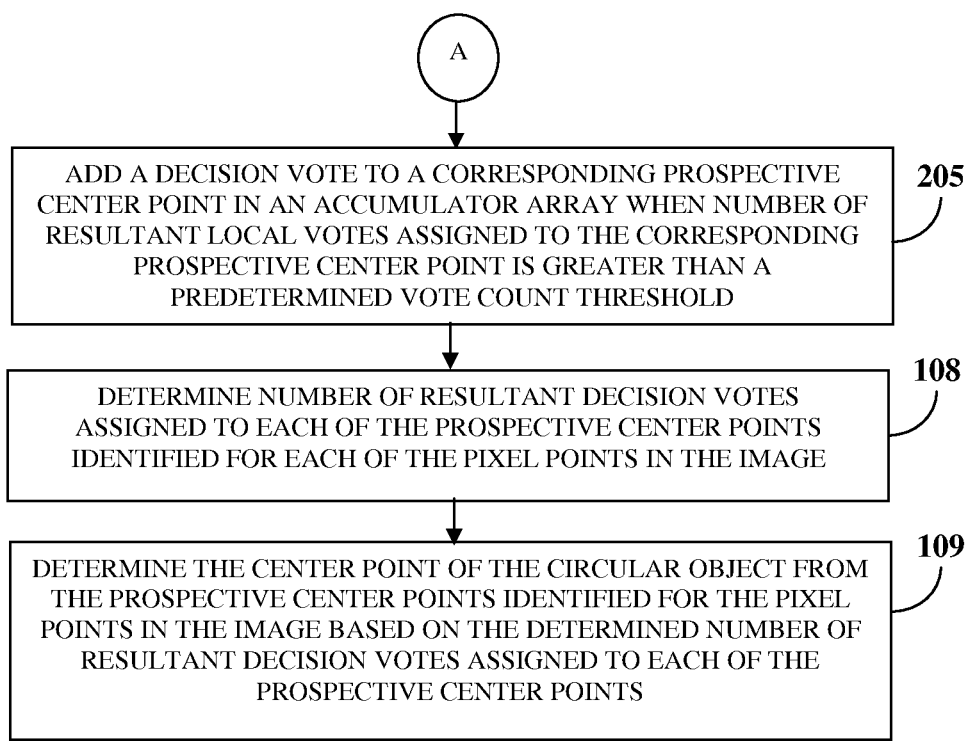

In an embodiment, the circular object identification system stores each decision vote assigned to a corresponding prospective center point for each of the pixel points in the accumulator array, only on completing validation of the prospective center point using a local neighborhood of pixel points around each of the prospective circumference points as disclosed in the detailed description of FIGS. 2A-2B.

The circular object identification system determines 108 the number of resultant decision votes assigned to each of the prospective center points identified for each of the pixel points in the image by counting each decision vote assigned to each of the prospective center points. The circular object identification system determines 109 the center point of the circular object from the prospective center points identified for the pixel points in the image based on the determined number of resultant decision votes assigned to each of the prospective center points. In an embodiment, the circular object identification system determines that the center point of the circular object is the prospective center point with the highest number of resultant decision votes, that is, a local maximum with the highest number of resultant decision votes.

In another embodiment, the circular object identification system determines that the center point of the circular object is the prospective center point for which the weighted average of the resultant decision votes is greater than a predetermined threshold. This allows determination of the center point of the circular object when there are multiple local maxima identified from the accumulator array. For example, the circular object identification system generates a Gaussian distribution of the resultant decision votes accumulated by each of the pixel points and determines that the center point of the circular object is a pixel point with a number of resultant decision votes equal to a centroid of the Gaussian distribution. This, for example, allows the circular object identification system to determine the center point of the circular object when there are multiple local maxima with a relatively equal number of resultant decision votes which does not allow the center point of the circular object to be directly determined.

In an embodiment, the circular object identification system sets a center threshold for a number of resultant decision votes that qualifies a prospective center point as the center point of the circular object. For example, consider a circular object that is a complete circle. If the radius of the circle is R, the circular object identification system sets a center threshold of pi*R. Therefore, a prospective center point is determined as the center point of the circle only when the number of resultant decision votes accumulated by the prospective center point is at least pi*R. In an example, once the entire image is scanned, the circular object identification system computes the mean of the number of resultant decision votes accumulated for all the prospective center points in the accumulator array. The circular object identification system sets a center threshold, for example, equal to four times the mean value. Therefore, if a circular object exists in the image, the number of decision votes that need to be accumulated by the center point of the circular object is greater than at least four times the mean value.

In another example, the circular object identification system identifies a region of interest (ROI) in the image as disclosed in the detailed description of FIGS. 9A-9D, and suppresses all local maxima other than a peak maximum, that is, a center point with the maximum number of resultant decision votes, in the region of interest. The region of interest is, for example, a predetermined area around the peak maximum. In another example, when the circular object identification system identifies intersecting circular objects, the center point of one of the circular objects may appear as a local maximum in the region of interest covered by a second circular object. In this case, the circular object identification system does not suppress the local maxima in the region of interest of each of the circular objects; instead, the circular object identification system verifies whether one of the local maxima is the center point of the second circular object in the image.

FIGS. 2A-2B illustrate an embodiment of the computer implemented method for determining the center point of a circular object in an image. The circular object identification system determines 101 a gradient direction for each of multiple pixel points in the image as disclosed in the detailed description of FIG. 1. The circular object identification system identifies 102 prospective center points of the circular object for each of the pixel points at a predetermined distance along the gradient direction of each of the pixel points and constructs 103 an axis that joins corresponding prospective center points and a corresponding pixel point as disclosed in the detailed description of FIG. 1.

Figure 7A:
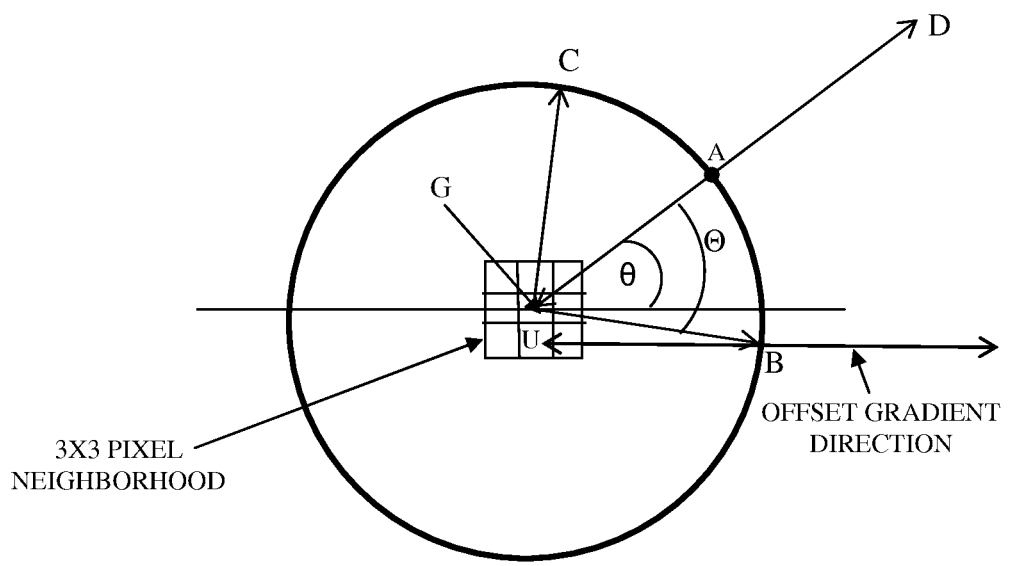
FIGS. 7A-7B exemplarily illustrate identification of a local neighborhood around each of a prospective center point and a prospective circumference point respectively, used for identifying the center point of the circular object in an image.

The circular object identification system identifies 201 a first local neighborhood of pixel points around each of the prospective center points, as exemplarily illustrated in FIG. 7A for the prospective center point A. For example, the circular object identification system positions a two dimensional array around each of the prospective center points to select all the pixel points covered within a region defined by the two dimensional array. The two dimensional array is in the form of a grid positioned around a prospective center point. The selection of the local neighborhood of pixel points by the circular object identification system compensates for defects arising due to image jitter resulting from the use of a digital image. Consider an example where the circular object identification system acquires a digital image for processing. Since the image is digital, the circular object in the image does not appear as a smooth curve but as a jagged curve reflecting variations arising from the use of discrete values. The circular object identification system adjusts the size of the local neighborhood array to compensate for defects arising during image acquisition. For example, the circular object identification system increases the size of the local neighborhood array to account for distortion of an object in the image such as flattening of the object, blurring, defects arising from variation in camera angles, etc.

The circular object identification system locates 104 prospective circumference points among the pixel points at predetermined angles from the constructed axis for the corresponding pixel point, at a predetermined distance from a corresponding prospective center point as disclosed in the detailed description of FIG. 1.

Figure 7B:
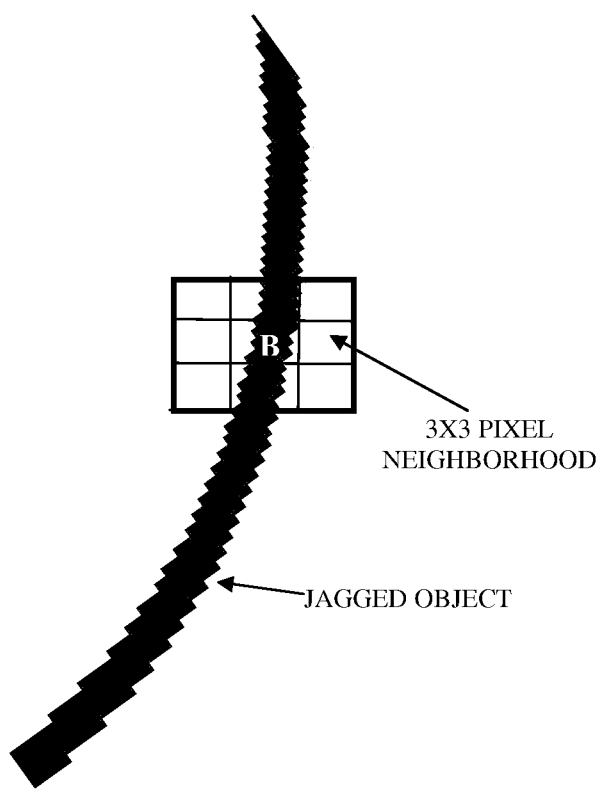

The circular object identification system identifies 202 a second local neighborhood of pixel points around each of the prospective circumference points as exemplarily illustrated in FIG. 7B, for a pixel point B. For example, the circular object identification system positions a two dimensional array around each of the prospective circumference points to select all the pixel points covered within a region defined by the two dimensional array. The two dimensional array is in the form of a grid positioned around each of the prospective circumference points. The selection of the local neighborhood of pixel points by the circular object identification system compensates for defects arising due to image jitter resulting from the use of a digital image. In an embodiment, the circular object identification system compares the gradient direction of each of the prospective circumference points and each of the pixel points in the second local neighborhood with a direction defined by each of the prospective circumference points and each of the pixel points in the second local neighborhood with a corresponding prospective center point, with respect to a reference axis to find a match. For example, the circular object identification system compares the gradient directions of the prospective circumference points C and B, and E and F, exemplarily illustrated in FIG. 5, and the gradient directions of the pixel points in the second local neighborhood (not shown) of the prospective circumference points C, B, E, and F with the directions defined by the corresponding effective angles ($\alpha$) defined for the prospective circumference points C, B, E, and F, and the pixel points in the second local neighborhood of the prospective circumference points C, B, E, and F respectively, with respect to the horizontal reference axis GI to find a match. The effective angle $\alpha$ is determined as disclosed in the detailed description of FIG. 1.

Furthermore, as disclosed in the detailed description of FIG. 1, the circular object identification system sets a predetermined angle margin for determining the match of the gradient direction of each of the prospective circumference points and each of the pixel points in the second local neighborhood around the prospective circumference points with the directions defined by their respective effective angles. Therefore, for a predetermined angle margin of $+\phi$ to $-\phi$, the circular object identification system verifies whether the difference between the gradient direction of a prospective circumference point or a pixel point in the second local neighborhood and the direction defined by the prospective circumference point or the pixel point in the second local neighborhood with the corresponding prospective center point is within $+\phi$ to $-\phi$. Considering the example where the effective angle of a prospective circumference point is $\alpha$, the circular object identification system determines a match if the gradient direction of the prospective circumference point is within the range $[\alpha+\phi, \alpha-\phi]$.

The circular object identification system determines 203 convergence of the gradient direction of each of the prospective circumference points and each of the pixel points in the second local neighborhood, to a corresponding prospective center point or any of the pixel points in the first local neighborhood around the corresponding prospective center point, on finding the match, for example, by traversing the predetermined distance from each of the prospective circumference points and each of the pixel points in the second local neighborhood to reach the corresponding prospective center point or any of the pixel points in the first local neighborhood as disclosed in the detailed description of FIGS. 7A-7B. The use of local neighborhoods around the prospective center points and the prospective circumference points during determination of a center point of a circular object compensates for fluctuations in the gradient directions of the prospective center points and the prospective circumference points respectively, arising from the use of discrete values for measuring the gradient directions. The circular object identification system traverses the predetermined distance, that is, for example, the radius of the circular object from each of the prospective circumference points and each of the pixel points in the second local neighborhood to reach the corresponding prospective center point of the circular object or any of the pixel points in the first local neighborhood.

The circular object identification system assigns 204 a local vote to a corresponding prospective center point based on each determination of the convergence of the gradient direction of each of one or more of the prospective circumference points and the pixel points in the second local neighborhood to a corresponding prospective center point or any of the pixel points in the first local neighborhood. As used herein, the term "local vote" refers to a vote assigned to a prospective center point when the gradient direction of either a prospective circumference point located at a predetermined distance from that prospective center point or a pixel point in the second local neighborhood of that prospective circumference point converges to the prospective center point or to any pixel point in the first local neighborhood of that prospective center point.

The circular object identification system stores the local votes assigned to each of the prospective center points in a separate local voting buffer. As used herein, the term "local voting buffer" refers to a temporary storage location for storing all the local votes assigned to a prospective center point, where the prospective center point is identified for a pixel point among the pixel points in the image. Furthermore, the circular object identification system stores a mapping of the number of local votes assigned to a particular prospective center point against the pixel point associated with identification of that particular prospective center point and the corresponding prospective circumference points that contribute the local votes to that particular prospective center point in a lookup table. Consider an example where a 3×3 local neighborhood array is positioned around each of the prospective circumference points and each of the prospective center points, where the prospective center points and the prospective circumference points are determined from a pixel point A, exemplarily illustrated in FIG. 5, as disclosed in the detailed description of FIG. 1. The gradient directions of a maximum of 9 pixel points in each of the local neighborhood arrays of the prospective circumference points can converge to a corresponding prospective center point or to a pixel point in a 3×3 local neighborhood array positioned around that prospective center point. If each convergence of the gradient direction of a pixel point from among the 3×3 local neighborhood array positioned around each of the prospective circumference points C and B in FIG. 5 to a corresponding prospective center point G or to a pixel point in a 3×3 local neighborhood array positioned around the prospective center point G is considered equivalent to a single local vote, the resultant local votes contributed to the prospective center point G by the prospective circumference points C and B and the pixel points in their respective 3×3 local neighborhoods, translates to a maximum of 18. The circular object identification system maps the resultant local votes to the pixel point A and stores the mapping in a lookup table.

The circular object identification system adds 205 a decision vote to a corresponding prospective center point in an accumulator array when the number of resultant local votes assigned to the corresponding prospective center point determined by counting each local vote assigned to the corresponding prospective center point, is greater than a predetermined vote count threshold. For example, the circular object identification system adds a decision vote to a selected prospective center point in the accumulator array only when the number of resultant local votes assigned to that corresponding prospective center point is greater than a predetermined vote count threshold of 10. This ensures that the accumulation of decision votes for a selected prospective center point is performed only when at least a predetermined number of pixel points from among the prospective circumference points and the pixel points in the second local neighborhood around each of the prospective circumference points contribute local votes to the prospective center point of the circular object.

Consider an example where the circular object identification system sets a predetermined vote count threshold of 9. The circular object identification system performs local voting, that is, the circular object identification system identifies a local neighborhood of pixel points around each of the prospective center points and the prospective circumference points, and assigns a local vote to a corresponding prospective center point based on each determination of the convergence of the gradient direction of each of one or more of the prospective circumference points and the pixel points in the local neighborhood around each of the prospective circumference points to that corresponding prospective center point or any of the pixel points in the local neighborhood around the corresponding prospective center point. In this example, the circular object identification system first verifies that the number of resultant local votes contributed by pixel points from among the prospective circumference points and the pixel points in the local neighborhood around each of the prospective circumference points to a prospective center point is at least 10, and increments the accumulator array at the location of that prospective center point by one. That is, the circular object identification system adds a decision vote to that prospective center point in the accumulator array. Furthermore, the circular object identification system stores the local votes in a separate local voting buffer and stores a mapping of the number of local votes assigned to a particular prospective center point against the pixel point associated with identification of that particular prospective center point and the corresponding prospective circumference points that contribute the local votes to that particular prospective center point in a lookup table. The circular object identification system uses the mapping to populate an angle histogram.

In an embodiment, the circular object identification system adds a decision vote to both the prospective center points in the accumulator array, when the resultant local votes assigned to each of the corresponding prospective center points are equal. In another embodiment, the circular object identification system adds a decision vote to one of the corresponding prospective center points in the accumulator array, when the resultant local votes assigned to that particular prospective center point are greater than the resultant local votes assigned to the other prospective center point. Consider an example where a first prospective center point receives 12 local votes and a second prospective center point receives 14 local votes. In this example, the circular object identification system adds a decision vote to the accumulator array only at the second prospective center point.

The circular object identification system determines 108 the number of resultant decision votes assigned to each of the prospective center points identified for each of the pixel points in the image by counting each decision vote assigned to each of the prospective center points. The circular object identification system determines 109 the center point of the circular object from the prospective center points identified for the pixel points in the image based on the determined number of resultant decision votes assigned to each of the prospective center points as disclosed in the detailed description of FIG. 1.

Figure 3A:
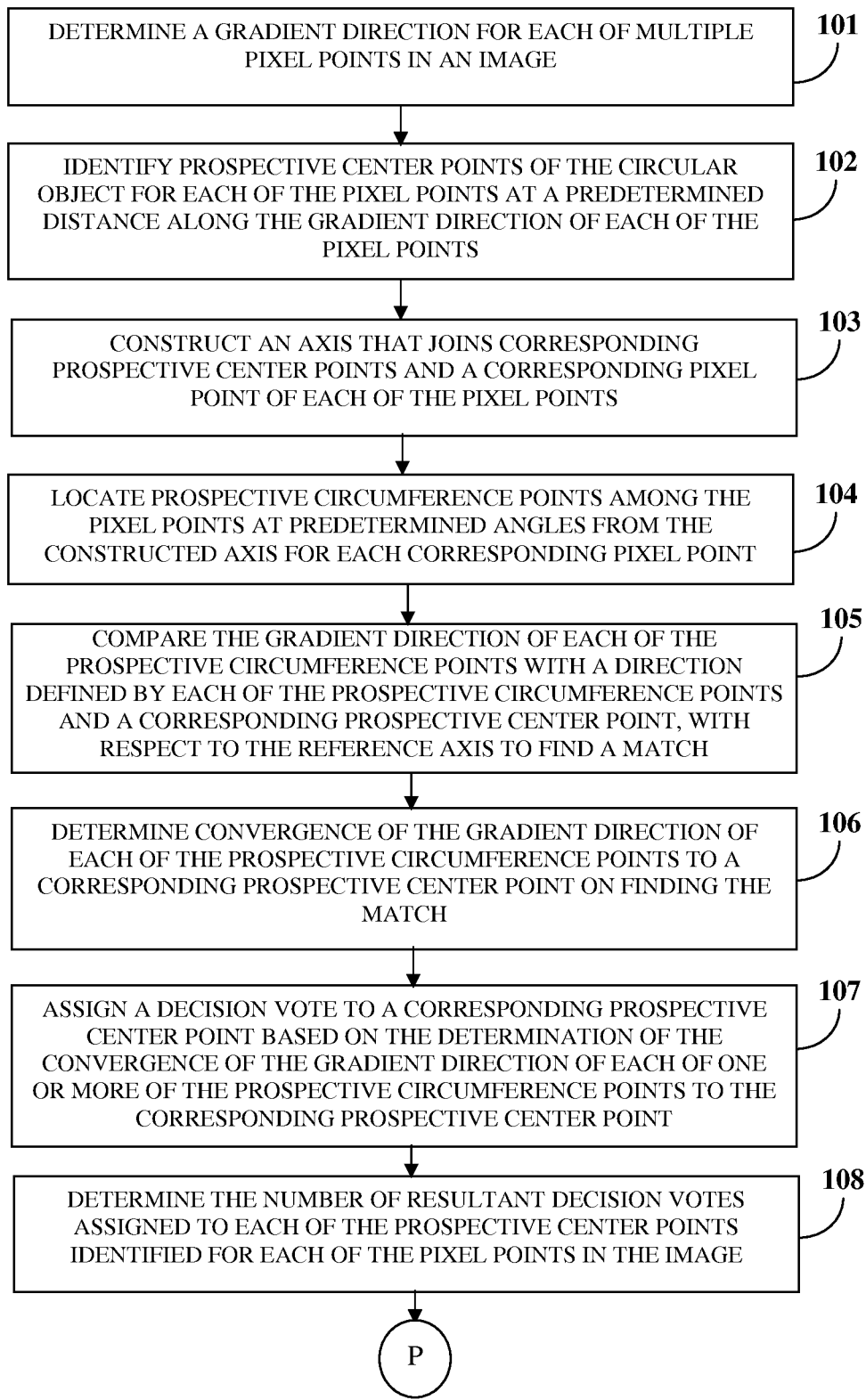
FIGS. 3A-3B illustrate a computer implemented method for identifying a circular object in an image.
Figure 3B:
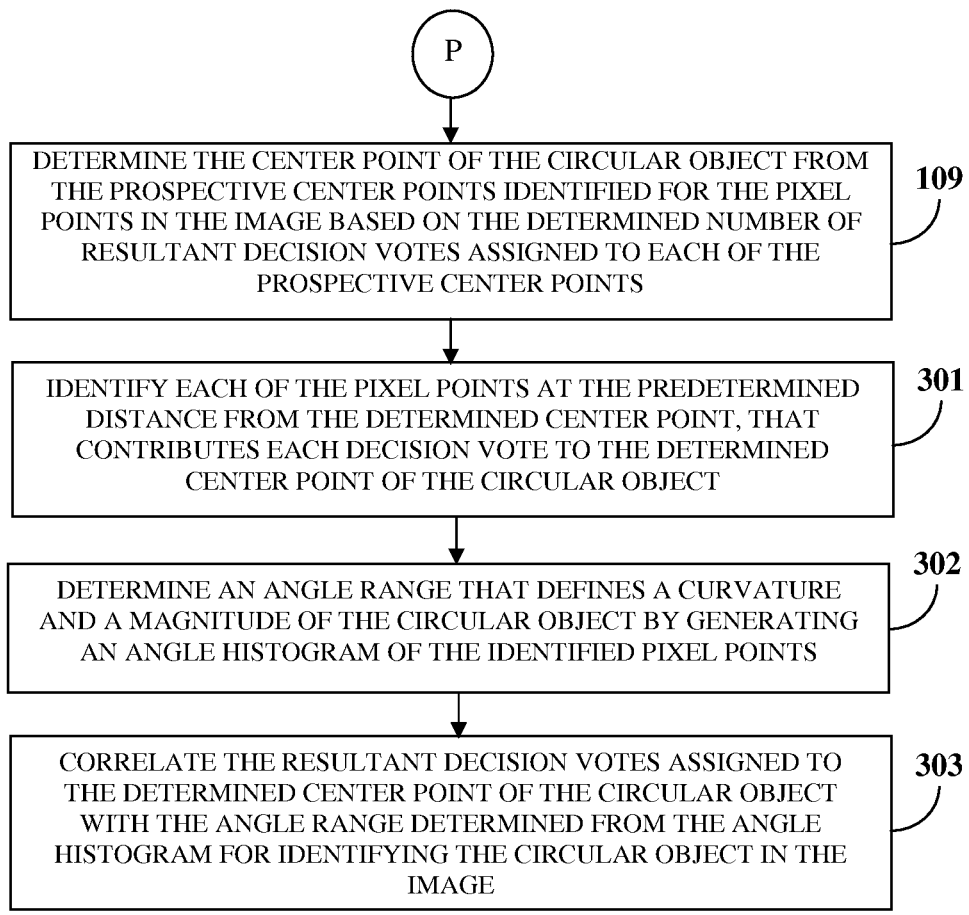

FIGS. 3A-3B illustrate a computer implemented method for identifying a circular object in an image. The computer implemented method disclosed herein provides a circular object identification system for identifying the circular object in the image. The circular object identification system disclosed herein performs the steps 101, 102, 103, 104, 105, 106, 107, 108, and 109 for determining the center point of the circular object as disclosed in the detailed description of FIG. 1. The circular object identification system disclosed herein performs local voting by performing the steps 201, 202, 203, 204, and 205, during storage of each decision vote assigned to a corresponding prospective center point for each of the pixel points in an accumulator array as disclosed in the detailed description of FIGS. 2A-2B.

Figure 6A:
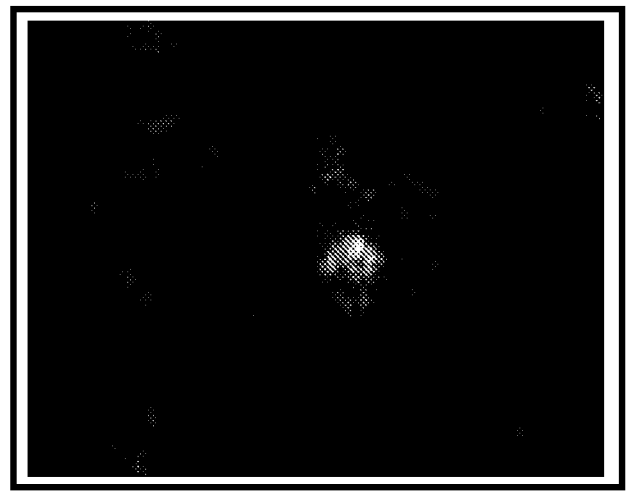
FIGS. 6A-6C exemplarily illustrate images showing distribution of pixel points at individual stages of the method for identifying a circular object in an image.
Figure 6B:
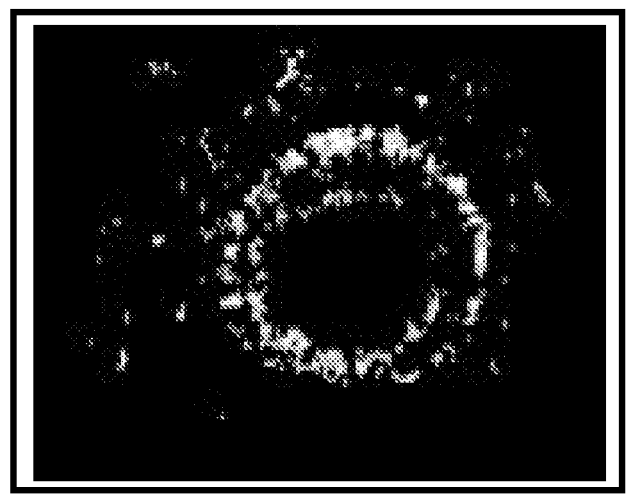
Figure 6C:
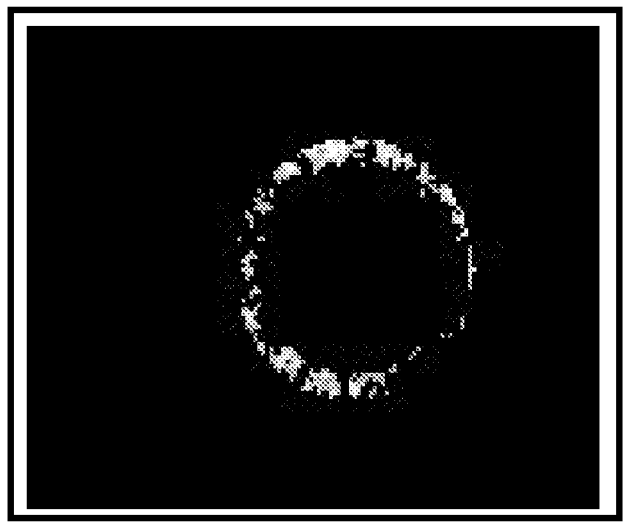

After determination of the center point of the circular object, the circular object identification system identifies 301 each of the pixel points in the image that are at the predetermined distance from the determined center point as exemplarily illustrated in FIG. 6C, and that contribute a decision vote to the determined center point of the circular object. The circular object identification system, for example, constructs a circle with reference to the determined center of the circular object using a radius equal to the predetermined distance. The circular object identification system then identifies all the pixel points that lie on the circumference of the circular object and each of which has contributed a decision vote to the determined center point of the circular object. Further, the circular object identification system filters out noise pixel points that contribute decision votes to the center point but do not lie on the circumference of the circular object. That is, the circular object identification system filters out all pixel points that do not lie on the circumference of the constructed circle. In an embodiment, in addition to identifying the pixel points that lie on the circumference of the circular object, the circular object identification system also identifies a neighborhood of pixel points around the circumference of the circular object that contribute a decision vote to the determined center point of the circular object, to account for those pixel points that are slightly displaced from the exact circumference of the circular object but which have contributed a decision vote each to the determined center point. The circular object identification system allows these pixel points to account for the variations in the positions of the pixel points induced by the use of a digital image.

The circular object identification system determines 302 an angle range that defines a curvature and a magnitude of the circular object, for example, by generating an angle histogram of the identified pixel points. As used herein, the term "angle range" refers to a range of angles within which pixel points in the image contribute a non-zero number of local votes to the center point of the circular object. The curvature of the circular object determines a type of the circular object based on the angle range. For example, an angle range of 180 degrees indicates a semi-circular object. The magnitude of the circular object is, for example, the concentration of the pixel points within a predetermined angle range.

The circular object identification system determines a number of local votes contributed by each of the identified pixel points to the determined center point, for example, using each mapping stored in the lookup table. The local votes assigned to a prospective center point are determined for each of the pixel points as disclosed in the detailed description of FIGS. 2A-2B. For example, the circular object identification system determines that a pixel point A is associated with 18 local votes contributed to the center point.

The circular object identification system maps the number of local votes contributed by each of the identified pixel points to a predetermined angle measure for generating the angle histogram. As used herein, the term "predetermined angle measure" refers to an angle between a line segment that connects a center point of a circular object to a pixel point on the circumference of the circular object and a reference axis. For example, the circular object identification system maps 18 local votes to an angle measure of 50 degrees in a graphical representation of the angle histogram as exemplarily illustrated in FIG. 8B. Furthermore, at any particular angle measure there can be more than one pixel point with a number of local votes greater than the predetermined vote count threshold. That is, there can be more than one pixel point at the predetermined angle measure whose associated prospective circumference points successfully pass the steps 105 and 106 disclosed in the detailed description of FIG. 1. In this case, the circular object identification system compares the number of local votes mapped to each of the pixel points associated with the particular angle measure and selects the highest number of local votes contributed by a pixel point from among these pixel points, for populating the angle histogram. Furthermore, in an embodiment, the circular object identification system considers the local neighborhood around each of the pixel points. The circular object identification system determines the angle range using each predetermined angle measure with a non-zero number of local votes.

The circular object identification system compares an average number of local votes for the determined angle range with a predetermined angle threshold for validating the circular object in the image. As used herein, the term "validating the circular object" refers to verifying the presence of the circular object in the image by determining whether the type of the circular object, as defined by the decision votes, the angle range, the average number of non-zero local votes, etc., is consistent with the limits for the decision votes, the angle range, the average number of non-zero local votes, etc., set based on the kind of projection of the circular object in the image. The projection of the circular object in the image depends, for example, on the camera angle, that is, whether the camera angle is perpendicular to the plane of the circular object or is tilted, the quality of the images captured in a video, defined by the amount of noise in the images, the type of circular object, that is, whether the circular object is a rigid circular object such as a circular cup or a non-rigid circular object such as a vehicle tire. The angle threshold may be set as a fraction of the maximum number of local votes that can be mapped to a particular pixel point. Considering a 3×3 local neighborhood around each of the prospective circumference points defined by a particular pixel point with respect to the corresponding prospective center point, the total number of local votes mapped to the particular pixel point is 18. Therefore, the predetermined angle threshold is set equal to (¾)*18 votes~13 votes. Therefore, the circular object identification system validates the circular object in the image if the average number of local votes determined from the angle histogram, within the obtained angle range, is greater than 13.

The circular object identification system correlates 303 the resultant decision votes assigned to the determined center point of the circular object with the angle range determined from the angle histogram for identifying the circular object in the image.

Consider an example where the angle strength is 4229 and the angle range is 282 degrees. The angle strength is the sum of the local votes mapped to all the angle measures included in the angle range determined from the angle histogram. The angle range comprises all the angle measures in the angle histogram that have a non-zero number of local votes. The maximum number of local votes for a pixel point in this example is 18. The angle threshold is set as 13. The circular object identification system computes the average number of local votes as 4229/282~15 votes. The average number of local votes is greater than the predetermined angle threshold value of 13. This validates the circular object in the image. Further, the circular object identification system obtains the total number of decision votes accumulated in the accumulator array for the determined center point. Assuming the shape of the circular object is a perfect single solid line unbroken circle, the number of decision votes assigned to the center point is, for example, at least pi, that is, about 3.14 times the radius of the circular object; ideally, the number of decision votes accumulated at the center point is 2*pi*R, where R is radius of the circular object. The circular object identification system correlates the angle range, the average number of local votes per pixel point, and the total number of resultant decision votes assigned to the center point, to obtain the exact shape of the circular object.

Furthermore, the circular object identification system determines the magnitude of the circular object using the angle histogram. Consider an example where the center point of a circular object has accumulated a total number of resultant decision votes approximately equal to 2*pi*radius (2ΠR). The circular object identification system generates the angle histogram for the pixel points in the image of the circular object and determines that the angle range is between 0 degrees and 180 degrees. The circular object identification system determines the shape of the circular object, that is, for example, a semi-circular shape based on the determined angle range. Furthermore, the circular object identification system determines whether the concentration of pixel points within the determined angle range of the semi-circular object is greater than the concentration of pixel points for a typical two-dimensional semi-circular object. Considering that each pixel point on the circumference of the circular object contributes one decision vote to the center point, the circular object identification system verifies whether the number of resultant decision votes accumulated at the center point of the semi-circular object is greater than pi*radius (R), which is the expected number of decision votes for a semi-circular object. Therefore, the circular object identification system determines that the semi-circular object has a well-defined thickness.

In another example, the circular object identification system distinguishes a mudguard attached to a vehicle tire, from the vehicle tire, based on the greater thickness of the mudguard when compared to the thickness of the vehicle tire, in case the vehicle tire is only partially visible in the image. In another example, the circular object identification system determines that a circular object has an arcuate shape even when the local votes are distributed throughout the angle histogram, if the number of decision votes at the center point, for example, equal to pi*R/2 is not sufficient to consider the circular object as a circle. Therefore, the circular object identification system determines the shape and magnitude of the circular object based on both the angle histogram and the number of decision votes accumulated at the center point.

Furthermore, the circular object identification system identifies concentric circular objects in the image. The circular object identification system identifies the center point of a circular object corresponding to a predetermined distance equal to the predetermined radius of the circular object. The circular object identification system identifies pixel points corresponding to a circumference of the circular object. The circular object identification system then increments the predetermined radius sequentially as disclosed in the detailed description of FIG. 1, and verifies the existence of a circular object for each of the sequentially incremented radii. The circular object identification system determines the existence of the concentric circular objects considering all the radii within the radius ranges, where the radius is referenced from the center point of the circular object. In an example, the circular object identification system starts from a smallest possible radius and verifies the existence of a circle for that radius. The circular object identification system increments the radius in steps and verifies the existence of the circles for each of the incremented radii to determine concentric circles. In another example, the circular object identification system starts from the highest possible radius and decrements the radius in steps for verifying the existence of concentric circles for each of the decremented radii. Consider an example of a vehicle tire that comprises multiple concentric circles. The circular object identification system first determines the largest possible semi-circular object, for example, a mudguard on the vehicle tire. The circular object identification system then determines the largest possible circular object that is a complete circle, that is, a circular object that is not semi-circular or arcuate. The circular object identification system determines the actual-radius of the vehicle tire by considering the radius of the first circle that follows the mudguard. Furthermore, when the size of the vehicle tire is larger with multiple concentric circles, the circular object identification system initiates the identification of concentric circles from the highest possible radius and sequentially moves to the lowest possible radius.

In an embodiment, the circular object identification system determines a number of pixel points associated with each of an upper surface and a lower surface of the circular object in the image. The circular object identification system compares the number of pixel points associated with the upper surface of the circular object with the number of pixel points associated with the lower surface of the circular object for identifying a type of the circular object. The circular object identification system determines the number of pixel points associated with an upper surface and a lower surface of a circular object, for example, a vehicle tire to identify, for example, a mudguard on the vehicle tire in the image of the vehicle. The circular object identification system determines the angle range from the angle histogram of the circular object and verifies that the angle range of the angle histogram predominantly lies, for example, between 0 degrees and 180 degrees. Furthermore, the circular object identification system determines whether the pixel points associated with the upper surface of the circular object contribute a number of local votes greater than a number of local votes contributed by the pixel points associated with the lower surface of the circular object, by a predetermined ratio. For example, the circular object identification system identifies the mudguard on the vehicle tire on determining that the number of local votes contributed by pixel points in the upper surface of the circular object, that is, the pixel points within an angle range between 0 degrees and 180 degrees is at least four times greater than the number of local votes contributed by pixel points in the lower surface of the circular object, that is, the pixel points within an angle range between 180 degrees and 360 degrees. The circular object identification system determines the radius of the vehicle tire by selecting the radius of the largest circular object before the identification of the mudguard.

In an embodiment, the circular object identification system determines characteristics of a first circular object and one or more second circular objects associated with the first circular object to classify a device associated with the first circular object and the second circular objects in the image. Consider an example where the device is a vehicle, the first circular object is a vehicle tire, and the second circular objects comprise the other vehicle tires. The characteristics of the first circular object, that is, a vehicle tire and the second circular objects, that is, the other vehicle tires, comprise, for example, one or more of a radius of each of the vehicle tires, the number of vehicle tires, and distances between the vehicle tires.

The number of vehicle tires can be further used to determine the number of axles on the vehicle. The circular object identification system processes a sequence of images of the vehicle for determining the number of tires of the vehicle. Based on the number of tires of the vehicle, the circular object identification system determines the number of axles of the vehicle. The circular object identification system identifies the vehicle tires, for example, by analyzing the activity of the vehicle. The circular object identification system records the first image that captures the vehicle tire as a reference image frame and the position coordinates of a point on the vehicle tire, for example, the X-Y coordinates of the center point of the vehicle tire as the reference coordinates. The circular object identification system then tracks the changing X-Y coordinates of the center point of the vehicle tire in accordance with the linear movement of the center point of the vehicle tire, when the vehicle tire is in motion. The circular object identification system tracks a series of image frames that follows the reference image frame to monitor the distance covered by the vehicle tire.

Furthermore, in order to determine the distance between two consecutive vehicle tires of a vehicle, the circular object identification system first needs to determine two distinct circular objects in the image. The circular object identification system distinguishes between two consecutive vehicle tires by first identifying a point at which a first vehicle tire in the current field of view has exited and a second vehicle tire has entered the field of view of an image capture device. In an example, the circular object identification system identifies a circular object in an image frame which has a radius equal to the predetermined radius of the first vehicle tire. The circular object identification system then checks whether the position coordinates of the center point of the circular object vary by a predetermined distance in the direction opposite to the direction of the motion of the first vehicle tire being tracked. If the position coordinates of the circular object under consideration vary in a direction opposite to the direction of the first vehicle tire being tracked, the circular object identification system determines that the circular object is the second vehicle tire that has entered the field of view of the image capture device. In another example, since the images of the vehicles are captured asynchronously, the coordinates of the center point of the second vehicle tire are determined by dividing the field of view into image sectors, and tracking whether the coordinates of the circular object in the image fall into a different image sector. In another example, the circular object identification system identifies a second vehicle tire by identifying an abrupt variation in the coordinates of the center point in a direction opposite to the direction of motion of the first vehicle tire. Consider an example where the X-Y coordinates of the center point of a first vehicle tire is (50, 10). The coordinates of the center point of the first vehicle tire increase, for example, as (60, 10), (70, 10), and so on. When the circular object identification system determines that the coordinates of the center point of a vehicle tire have abruptly changed to (30, 10), the circular object identification system determines that the second vehicle tire has entered the field of view.

Furthermore, the circular object identification system determines the distance between the vehicle tires by identifying consecutive circular objects in the image of the vehicle. The circular object identification system, for example, triggers a message to an image acquisition system via a communication link for automatically adjusting the position of an image capture device such as a digital camera to enable capture of the complete vehicle in the image. The circular object identification system identifies consecutive circular objects in the image each of which have a radius specified for the particular vehicle. Consider an example where the radius of a front vehicle tire is different from the radius of a rear vehicle tire. In this example, the circular object identification system determines the presence of a circular object in the image which has a radius equal to the radius defined for either the front vehicle tire or the rear vehicle tire. On verifying the presence of a first circular object in the image with one of the defined radii, the circular object identification system then verifies whether there is a second circular object in the image with the other defined radius. If the circular object identification system identifies a second circular object with the other defined radius, the circular object identification system determines that there are two consecutive vehicle tires of the same vehicle in the image. The circular object identification system computes the distance between the consecutive circular objects, for example, based on the difference between the coordinates of the center points of the identified consecutive circular objects along a horizontal reference axis. The circular object identification system scales the computed distance between the consecutive circular objects by a predetermined scaling factor for obtaining the distance between successive vehicle tires.

The circular object identification system disclosed herein may be employed in a number of practical applications, for example, toll collection applications, highway surveying, etc. For example, the size and structure of a vehicle tire identified using the circular object identification system can be used to analyze and identify the type of vehicle for charging a toll fee based on the type of vehicle. Consider an example where the circular object identification system is employed in a highway survey. The design parameters for construction of the highway consider the types of vehicles that are likely to use the highway, the possible number of vehicles active on the highway at a given time of the day, that is, the vehicle density, etc. The circular object identification system is used for classifying vehicles according to the size of the vehicles. For example, the circular object identification system considers the radius of the vehicle tires, the distance between two consecutive vehicle tires of the vehicle that is used to estimate the length of the vehicle, etc., in order to classify a particular vehicle. This provides a rough evaluation of the type of vehicles and the vehicle density at a given time. In another application, the circular object identification system can be used to identify multiple circular objects and concentric circular objects in the image. For example, the circular object identification system may be used to identify a set of circular objects such as a stack of coins that may be used in applications for coin packaging.

FIG. 4 exemplarily illustrates a circular object, showing a representation of gradient directions determined for a few of the pixel points associated with the circular object. The gradient direction at each of the pixel points defines the angular orientation related to a change in intensity at each of the pixel points, for example, with respect to a horizontal reference axis defined by the line segment 1 as exemplarily illustrated in the FIG. 4. For example, the gradient direction at the pixel point A is at an angular orientation of θ. The angular orientation does not specify whether the gradient direction is directed towards, that is, inside, or away, that is, outside the circular object.

FIG. 5 exemplarily illustrates a method for identifying the center point of a circular object. Consider a circular object represented by a circle P in the left bottom half of an image. Consider a virtual circular object represented by a circle Q in broken lines in the right top half of the image. The virtual circular object Q does not physically exist in the image. Consider a pixel point A as exemplarily illustrated in FIG. 5. The angular orientation defined by the gradient direction of the pixel point A is the same for the circular object represented by the circle P and the virtual circular object represented by the circle Q. That is, the gradient direction at the pixel point A does not confirm whether the center point of the circular object in the image lies in the area covered by the circle P or the circle Q. Therefore, in order to locate the prospective center points with reference to the pixel point A, the circular object identification system considers, along the angular orientation defined by the gradient direction of the pixel point A, both an inward direction towards the circle P and an outward direction towards the circle Q.

To find the exact center point of the circular object, the circular object identification system traverses a distance R equal to the predetermined distance, that is, the radius of the circular object, from the pixel point A along both the inward direction and the outward direction to identify the prospective center points G and D. The circular object identification system determines offset pixel points C, B, E and F at a predetermined angle of θ on either side of the gradient direction of the pixel point A represented by the line 1 in FIG. 5, where the prospective circumference points C and B correspond to the prospective center point G and the prospective circumference points E and F correspond to the prospective center point D. Consider the horizontal axis GI as the reference axis. The gradient direction at the pixel point C subtended as represented by the broken line GH is at 2θ with respect to the horizontal reference axis. This matches the direction defined by the pixel point C and the prospective center point G, that is, along the line GC.

The gradient direction at the pixel point B subtended as represented by the broken line GI is at 0 degrees with respect to the horizontal reference axis. This matches the direction defined by the prospective circumference point B and the prospective center point G, that is, along the line GB. However, the gradient directions at the offset prospective circumference points E and F corresponding to the prospective center point D, that is, EK and FM respectively, do not match the direction defined by the prospective circumference point E and the prospective center point D and the direction defined by the prospective circumference point F and the prospective center point D respectively, with respect to the horizontal reference axis, that is, along ED and FD respectively. This is because the prospective circumference points E and F do not lie on an actual circular object in the image and instead lie on a non-circular curve (not shown). The circular object identification system determines convergence of the gradient directions represented by the broken lines GH and GI of the prospective circumference points C and B respectively, to the corresponding prospective center point G on finding the match, for establishing that each of the prospective circumference points C and B lies on the circumference of the circular object. On determining convergence, the circular object identification system identifies the prospective center point G as the center point of the circular object with reference to the pixel point A and ignores the prospective center point D. Therefore, the circular object identification system increments the accumulator array only at the prospective center point G and not at the prospective center point D for the pixel point A. The circular object identification system repeats the steps 105 and 106 for each of the pixel points in the image as disclosed in the detailed description of FIG. 1, and accumulates decision votes at the corresponding prospective center points in the accumulator array. The circular object identification system determines the center point of a circular object in the image by comparing the resultant decision votes associated with each of the prospective center points and selecting a prospective center point with the highest number of decision votes.

FIGS. 6A-6C exemplarily illustrate images showing distribution of pixel points at individual stages of the method for identifying a circular object in an image. FIG. 6A exemplarily illustrates an image of the prospective center points of the circular object, identified by the circular object identification system, having a number of accumulated local votes greater than the predetermined vote count threshold, that is, all the prospective center points that have been assigned a decision vote in the accumulator array based on the resultant local votes, on passing the step 203 as disclosed in the detailed description of FIGS. 2A-2B. FIG. 6B exemplarily illustrates an image of all the pixel points that have contributed decision votes to the prospective center points exemplarily illustrated in FIG. 6A, and incremented the accumulator array.

FIG. 6C exemplarily illustrates an image of all the pixel points in the image that are at the predetermined radius of the circular object from a prospective center point selected by the circular object identification system from among the prospective center points exemplarily illustrated in FIG. 6A, which has the highest number of decision votes in the accumulator array. The circular object identification system filters the pixel points exemplarily illustrated in FIG. 6C from the set of pixel points exemplarily illustrated in FIG. 6B based on whether the pixel points lie on the circumference of the circular object which is determined using the selected prospective center point and a predetermined radius. The circular object identification system uses the pixel points exemplarily illustrated in FIG. 6C to populate an angle histogram.

FIGS. 7A-7B exemplarily illustrate identification of a local neighborhood around each of a prospective center point and a prospective circumference point respectively, used for identifying the center point of the circular object in an image. The pixel point G exemplarily illustrated in FIG. 7A is a prospective center point of the circular object in the image. The circular object identification system identifies a 3×3 first local neighborhood around the prospective center point G as exemplarily illustrated in FIG. 7A. Since the image considered in this example is a digital image, the periphery of the circular object is not smooth, that is, the curve appears jagged. Therefore, the slopes, that is, the gradient directions of the pixel points at the circumference of the circular object are not smooth and are discrete in nature. This means that although the gradient direction at the prospective circumference point B needs to match the direction GB in an ideal scenario, the gradient direction is slightly offset as represented by the line BU exemplarily illustrated in FIG. 7A. Therefore, on moving a distance equal to a radius R from the prospective circumference point B towards the prospective center point G, the line representing the gradient direction of the prospective circumference point B does not exactly converge to the prospective center point G, but converges to a pixel point U that lies in the local neighborhood of the prospective center point G.

On determining that the gradient direction of the prospective circumference point B converges to the pixel point U in the local neighborhood of the prospective center point G, the circular object identification system continues to consider the pixel point G as a prospective center point and increments the local votes assigned to the prospective center point G by one. Since the circular object identification system selects a prospective center point for the accumulator array only when the number of local votes associated with the prospective center point G is greater than a predetermined vote count threshold, the use of the local neighborhood around the prospective center point G by the circular object identification system allows for a more accurate determination of the center point of the circular object in digital images.

Furthermore, the circular object identification system identifies a second local neighborhood around each of the pixel points that can possibly lie on the circumference of the circular object. FIG. 7B exemplarily illustrates a second local neighborhood around a prospective circumference point B. The image considered by the circular object identification system in this example is a digital image of a non-rigid circular object with a jagged edge as exemplarily illustrated in FIG. 7B. Furthermore, the gradient direction determined for each of the pixel points is discrete. The circular object identification system therefore considers the gradient directions of all the pixel points that lie in the 3×3 local neighborhood of the prospective circumference point B and verifies whether the gradient direction of each of the pixel points converge in the local neighborhood of a prospective center point G as exemplarily illustrated in FIG. 7A. Therefore, the circular object identification system applies the second local neighborhood around each of the prospective circumference points to accommodate the variations in the gradient directions resulting from the non-rigidity of the circular object and the approximation introduced by the use of discrete values for the gradient directions.

Figure 8A:
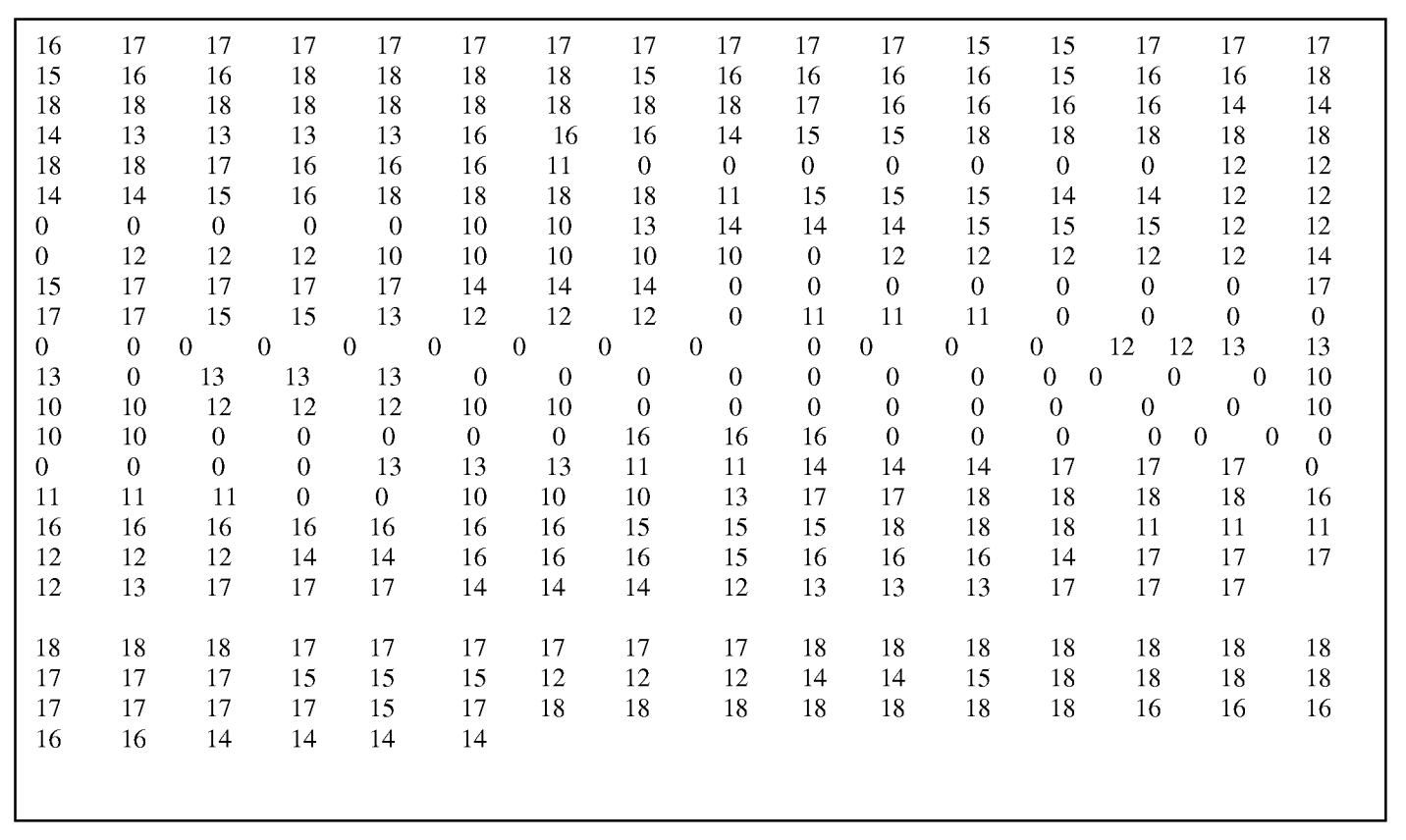
Figure 8B:
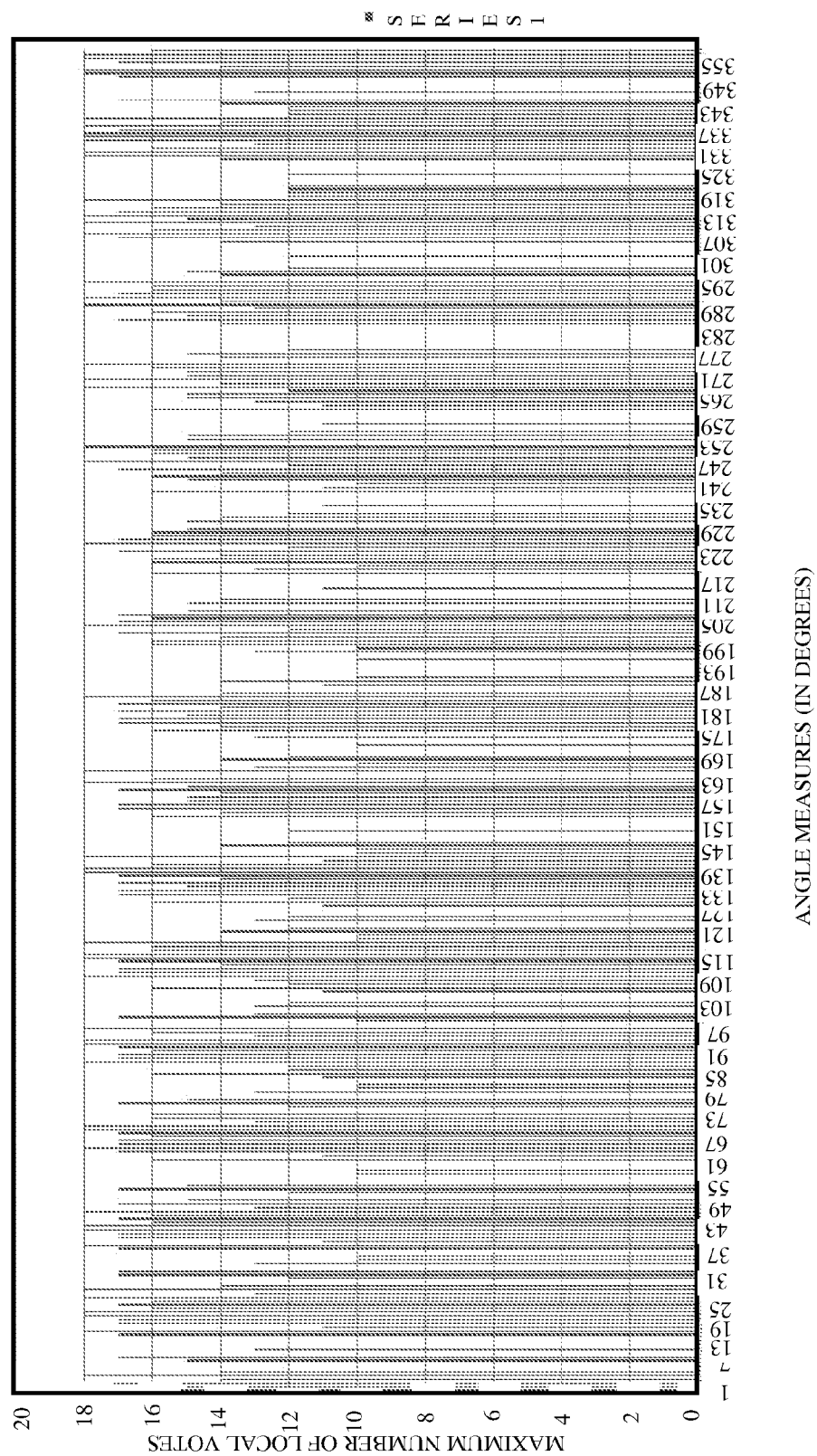
FIG. 8B exemplarily illustrates a graphical representation of an angle histogram generated by the circular object identification system for determining an angle range used for identifying a circular object in an image.

FIG. 8A exemplarily illustrates an array showing the number of local votes that are mapped to each of the pixel points at a predetermined angle measure and at a predetermined distance from the center point of a circular object in the image for generation of an angle histogram by the circular object identification system for identifying the circular object. The circular object identification system considers each predetermined angle measure, obtains the pixel point located at the particular predetermined angle measure and at the predetermined distance from the center point, references the mapping of the local votes to the pixel points that is stored in the lookup table, obtains the local votes mapped to the specified pixel point, and generates the array exemplarily illustrated in FIG. 8A. Therefore, the array comprises the number of local votes mapped to each predetermined angle measure corresponding to a particular pixel point in the image. The circular object identification system generates the angle histogram exemplarily illustrated in FIG. 8B based on the input data provided by the array exemplarily illustrated in FIG. 8A.

FIG. 8B exemplarily illustrates a graphical representation of an angle histogram generated by the circular object identification system for determining an angle range used for identifying a circular object in an image. As exemplarily illustrated in FIG. 8B, the X-axis represents the angle measures measured in degrees and the Y-axis represents the maximum number of local votes accorded to each angle measure. The angle histogram comprises angle measures, for example, between 0 degrees and 359 degrees. The angle measure of 360 degrees is not considered in the angle histogram since the angle measure 360 degrees is considered equivalent to 0 degrees. On an average each valid angle measure contributes, for example, at least ten local votes to the angle histogram.

The circular object identification system checks whether the angle histogram covers a sufficient angle range. The angle histogram exemplarily illustrated in FIG. 8B has an angle range of 282° with an angle strength of 4229 obtained from the array exemplarily illustrated in FIG. 8A. The angle strength is the sum of the local votes mapped to all the angle measures included in the angle range determined from the angle histogram. In an example, the circular object identification system automatically sets the angle threshold based on an angle strength and an angle range for a particular object. The angle range comprises all the angle measures in the angle histogram that have a non-zero number of local votes.

Furthermore, the circular object identification system adjusts the value of the angle threshold, for example, by setting a high angle threshold if the number of local votes mapped to most of the pixel points associated with the circular object in the image is comparatively much higher than the predetermined vote count threshold. Therefore, the circular object identification system sets the boundary limits for the angle threshold, the angle range, etc., based on the type of circular object. In an example, the circular object identification system defines the minimum value for the angle range as 50° to allow for the detection of arcuate objects. The circular object identification system defines the angle threshold, for example, as 800 and the angle range, for example, as 50° for a vehicle tire. Therefore, the circular object identification system determines that an object in an image is possibly a vehicle tire if the angle strength is greater than 800 and the angle range is greater than 50°. Furthermore, if the angle strength is concentrated in the upper part of the circle, that is, in the angle range between 0° and 180° of the angle histogram and the angle strength in the lower part of the circle, that is, between 180° and 360° of the circle is lesser than, for example, a quarter of the angle strength of the upper part of the circle, the circular object identification system identifies the object in the image as a mudguard attached to the vehicle tire.

The maximum number of local votes accumulated for a particular angle measure in the angle histogram is, for example, 18 as exemplarily illustrated in FIG. 8B. Consider an example, where each of the pixel points G, B, C, and D exemplarily illustrated in FIG. 7A is associated with a 3×3 local neighborhood as exemplarily illustrated for the pixel point B in FIG. 7B. Of the four pixel points indicated in FIG. 7A, pixel points C and B contribute to a prospective center point, for example, G of the circular object and, pixel points E and F (not shown in FIG. 7A) contribute to a prospective center point, for example, D of the circular object. Since the local neighborhood of each of the pixel points B, C, E and F has 9 pixel points each, and the prospective circumference points C and B are associated with the prospective center point G, the maximum number of local votes contributed to the prospective center point G is 2×9=18 votes.

FIGS. 9A-9D exemplarily illustrate identification of vehicle tires in an image according to the computer implemented method disclosed in the detailed description of FIG. 1 and FIGS. 2A-2B. The circular object identification system acquires an image of a vehicle exemplarily illustrated in FIG. 9A. The circular object identification system identifies a region of interest, that is, an area comprising a vehicle tire as exemplarily illustrated in FIG. 9B. The region of interest is, for example, marked manually by a user of the circular object identification system using a computing device.

Figure 9A:
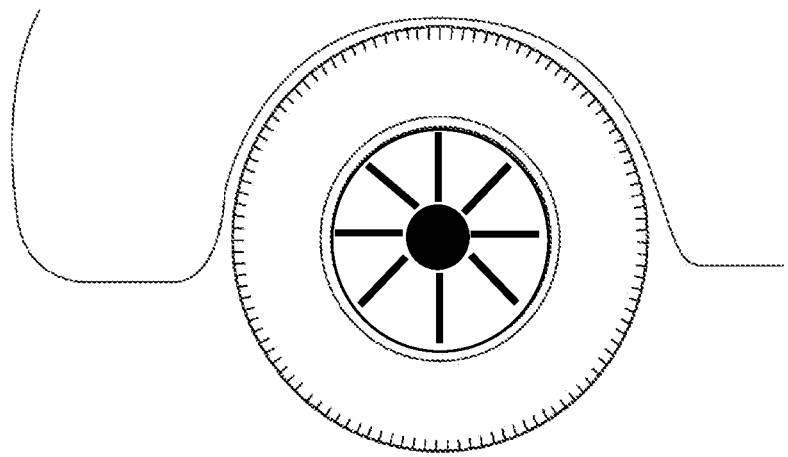
FIGS. 9A-9D exemplarily illustrate identification of vehicle tires in an image according to the computer implemented method disclosed herein.
Figure 9B:
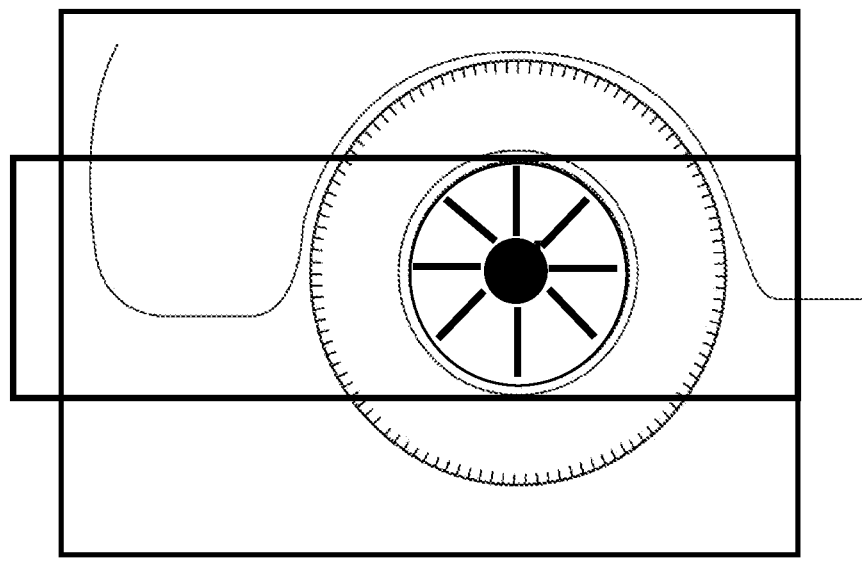
Figure 9C:
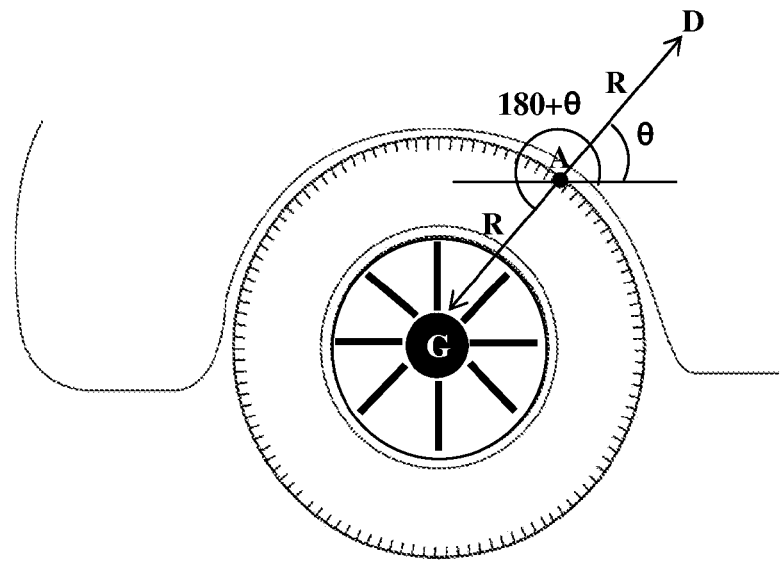

FIG. 9C exemplarily illustrates the gradient direction of a pixel point A, and the prospective center points G and D of the circular object determined using the computer implemented method disclosed in the detailed description of FIG. 1. Consider the pixel point A exemplarily illustrated in FIG. 9C. In this example, the pixel point A lies on the circumference of the vehicle tire; however, the steps 101, 102, 103, 104, 105, 106, and 107 as disclosed in the detailed description of FIG. 1, are similarly performed for other pixel points in the image. The circular object identification system obtains the gradient direction at each of the pixel points in the image by convolving the image with a Sobel operator and obtaining the partial derivatives of the image intensity function along the X and Y directions as disclosed in the detailed description of FIG. 1.

Depending on whether the surface of the vehicle tire is darker or lighter than its surrounding area, the gradient direction can either point inward or outward from the circumference of the vehicle tire. The computer implemented method disclosed herein places no constraint on the image that the surface of the vehicle tire in the image should be either darker or lighter than the surrounding area. Therefore, the gradient direction at a given pixel point can either point inward or outward from the circumference of the vehicle tire. Since the inward or outward pointing of the gradient direction is not apparent, the accumulator array would need to be incremented at both the prospective center points G and D which are at a distance of R from the pixel point A on either side along the gradient direction of the pixel point A. To avoid accumulation of decision votes at both the prospective center points G and D, the circular object identification system determines the actual center point of the circular object from among the prospective center points using the computer implemented method disclosed herein and accumulates decision votes at the actual center point.

Figure 9D:
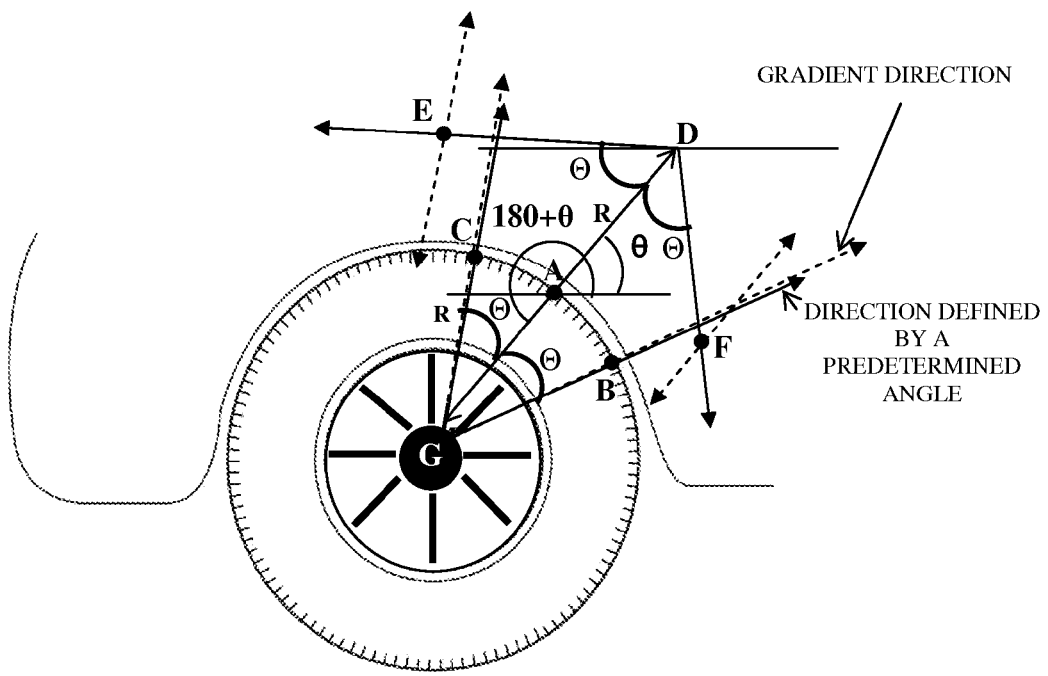

FIG. 9D exemplarily illustrates validation of a prospective center point of the vehicle tire. Consider the pixel points A, G and D. At pixel point A, the angular orientation defined by the gradient direction with respect to a horizontal reference axis is θ. The circular object identification system moves a distance R and −R from the pixel point A along the gradient direction defining the angle θ to reach the pixel points G and D. Both G and D are the prospective center points of the vehicle tire. However, instead of incrementing the accumulator array at the coordinates corresponding to both the prospective center points G and D, the circular object identification system performs the validation steps 105 and 106 disclosed in the detailed description of FIG. 1 to determine the actual center point of the vehicle tire.

Assuming initially that both G and D are prospective center points of the vehicle tire, the circular object identification system considers a predetermined angle Θ from both the prospective center points G and D, on either sides of the gradient direction of the pixel point A, to locate the prospective circumference points C and B with respect to the prospective center point G and the prospective circumference points E and F with respect to the prospective center point D. The prospective circumference point B is at a predetermined distance R and at an angle of (θ−Θ) and the prospective circumference point C is at a predetermined distance R at an angle of (θ+Θ) from the prospective center point G. The prospective circumference point F is at a predetermined distance of R and at an angle of (180+θ+Θ) from D and the prospective circumference point E is at a predetermined distance of R and at an angle of (180+θ−Θ) from D.

The gradient directions at the prospective circumference points B, C, E and F are exemplarily illustrated in FIG. 9D. At the prospective circumference points B and C, the gradient directions match the original directions BG and CG respectively, whereas at the prospective circumference points E and F the gradient directions do not match the original directions ED and FD respectively. On moving a distance of R and −R from the prospective circumference points B, C, E and F, the lines representing the gradient directions of the prospective circumference points B and C converge to G on one side where as lines representing the gradient directions of the prospective circumference points E and F do not converge at the prospective center point D. This is because the curve of the circular object is oriented towards the prospective center point G and not the prospective center point D. Therefore, in this example, only the prospective center point G is incremented in the accumulator array.

Furthermore, since the image considered in this example is a digital image, the gradient directions at the prospective circumference points B and C do not exactly match the direction represented by BG and CG respectively. This means that when the circular object identification system moves a distance equal to the radius R from each of the prospective circumference points B and C, the gradient directions do not converge exactly to the prospective center point G. Therefore, the circular object identification system identifies a local neighborhood around the prospective center point G, and verifies the convergence of the prospective circumference points in the local neighborhood around the prospective center point G.

Figure 10A:
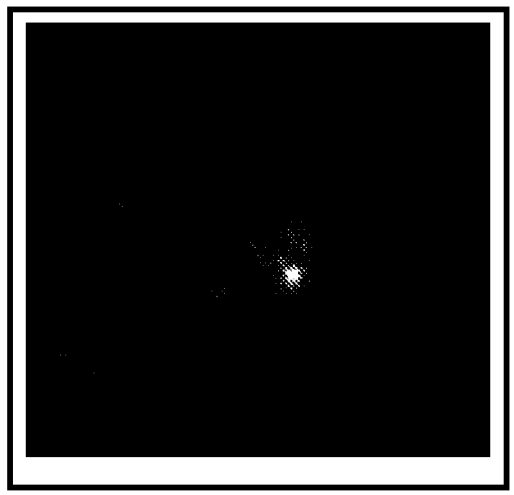
FIGS. 10A-10E exemplarily illustrate images showing distribution of pixel points in an image of a vehicle tire, captured during processing of the image for identifying the vehicle tire in the image.

FIGS. 10A-10E exemplarily illustrate images showing distribution of pixel points in an image of a vehicle tire, captured during processing of the image for identifying the vehicle tire in the image. The identification of the vehicle tire in the image by the circular object identification system enables classification of the vehicles based on the characteristics of the vehicle tire. FIG. 10A exemplarily illustrates a cluster of pixel points, that is, prospective center points that have been assigned decision votes, based on the steps 105 and 106 as disclosed in the detailed description of FIG. 1. The circular object identification system then selects a prospective center point with the highest number of resultant decision votes, greater than a center threshold as the center point of the vehicle tire. For example, the center threshold is pi*R where R is the predetermined radius of the vehicle tire. The circular object identification system, for example, identifies the center threshold based on the assumption that if the circumference of the vehicle tire is unbroken and completely populated by pixel points in the image, the total number of pixel points that contribute decision votes to the center point of the vehicle tire is 2*pi*R.

Furthermore, since the image considered in this example is a digital image, the circular object identification system identifies a local neighborhood of pixel points around a prospective center point of the vehicle tire and determines convergence of the prospective circumference points or the pixel points in the local neighborhood around each of the prospective circumference points, to the selected prospective center point or a pixel point in the local neighborhood around the selected prospective center point. The circular object identification system determines the number of resultant decision votes assigned to each of the pixel points clustered in the local neighborhood of the selected prospective center point. The circular object identification system considers each of the prospective center points with a number of resultant decision votes greater than a predetermined center threshold as a local maximum within a region of interest defined by the radius of the vehicle tire. The circular object identification system identifies the peak maximum among the local maxima as the center point of the vehicle tire.

Figure 10B:
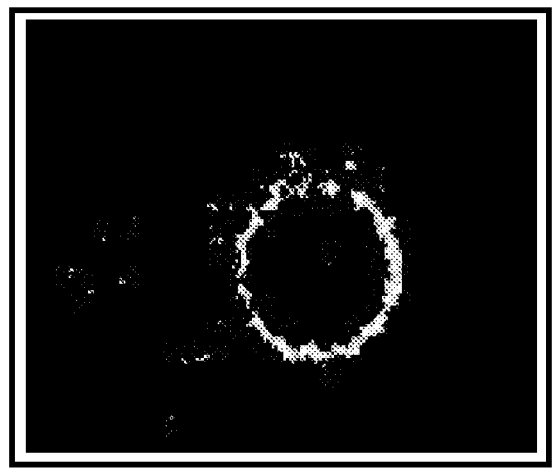
Figure 10C:
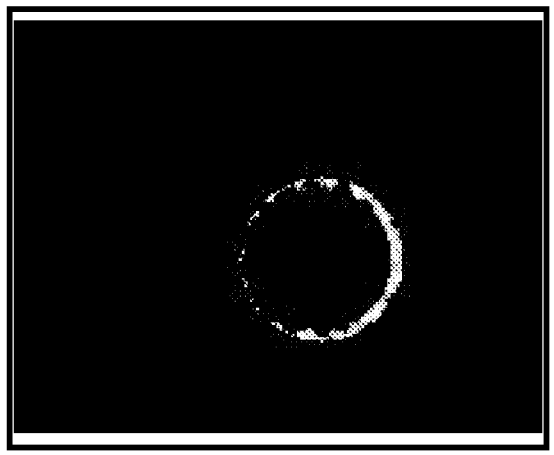
Figure 10D:
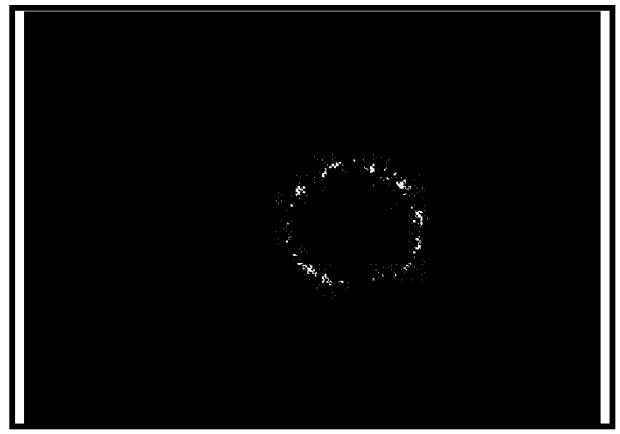

FIG. 10B exemplarily illustrates distribution of all pixel points whose gradient directions converge in the local neighborhood of the prospective center point and which contribute decision votes to the cluster of prospective center points exemplarily illustrated in FIG. 10A. FIG. 10C and FIG. 10D exemplarily illustrate the distribution of pixel points obtained after selectively filtering the pixel points determined to lie on the circumference of the vehicle tire, that is, the pixel points which lie at a predetermined radius from the pixel point identified as the center point of the vehicle tire by the circular object identification system.

Figure 10E:
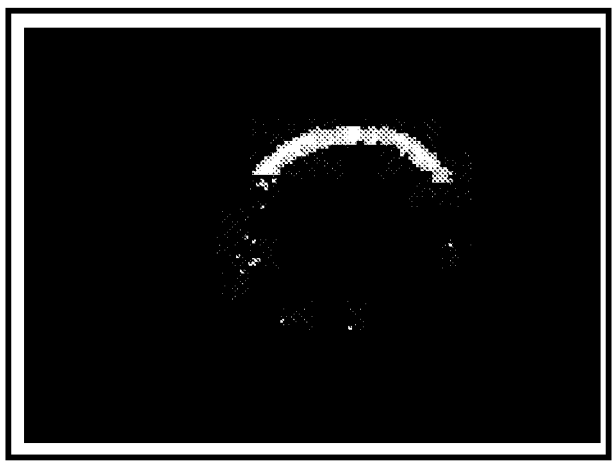
Figure 11A:
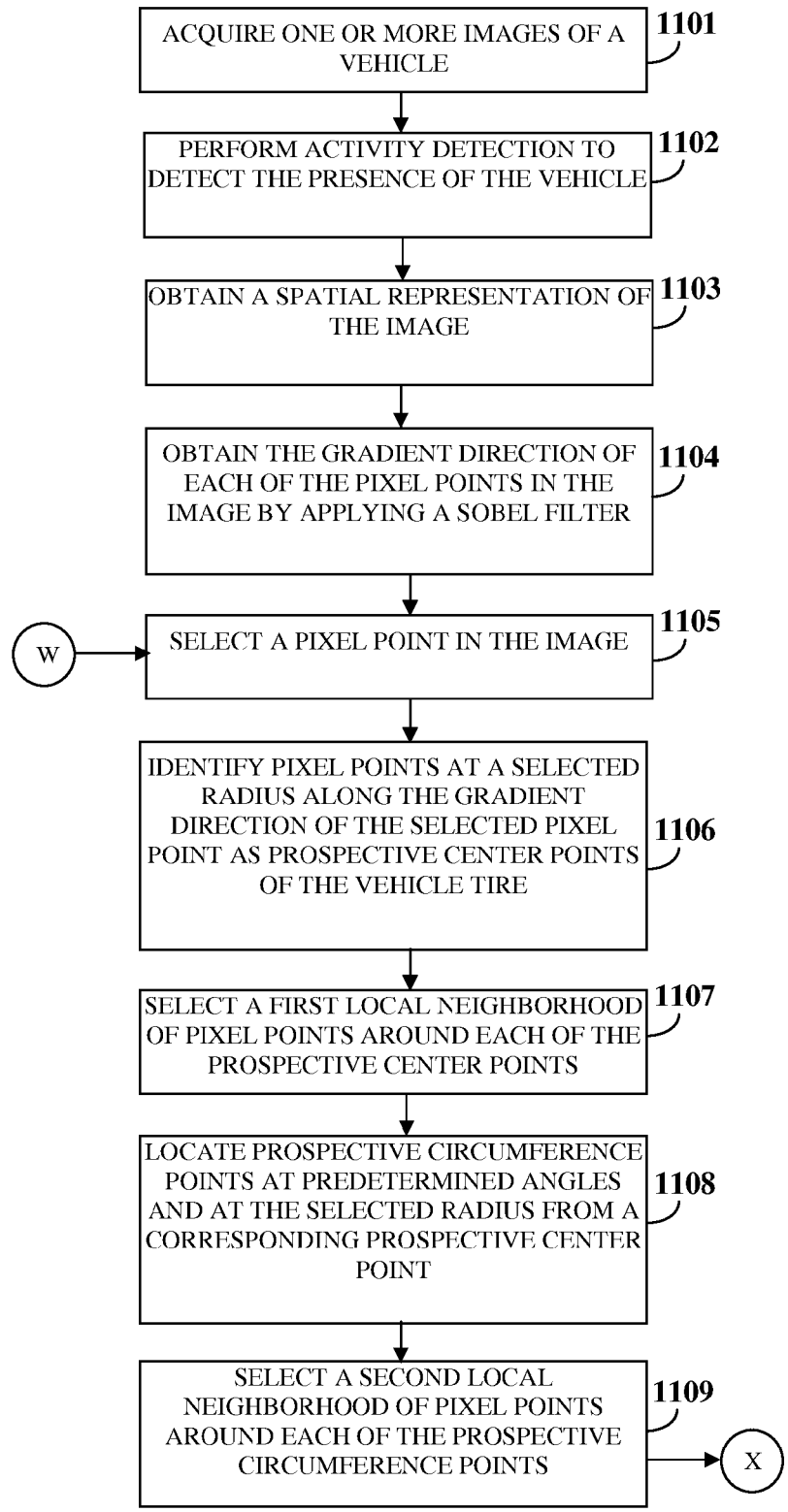
FIGS. 11A-11D exemplarily illustrate a flowchart comprising the steps for identifying a circular object in an image.
Figure 11B:
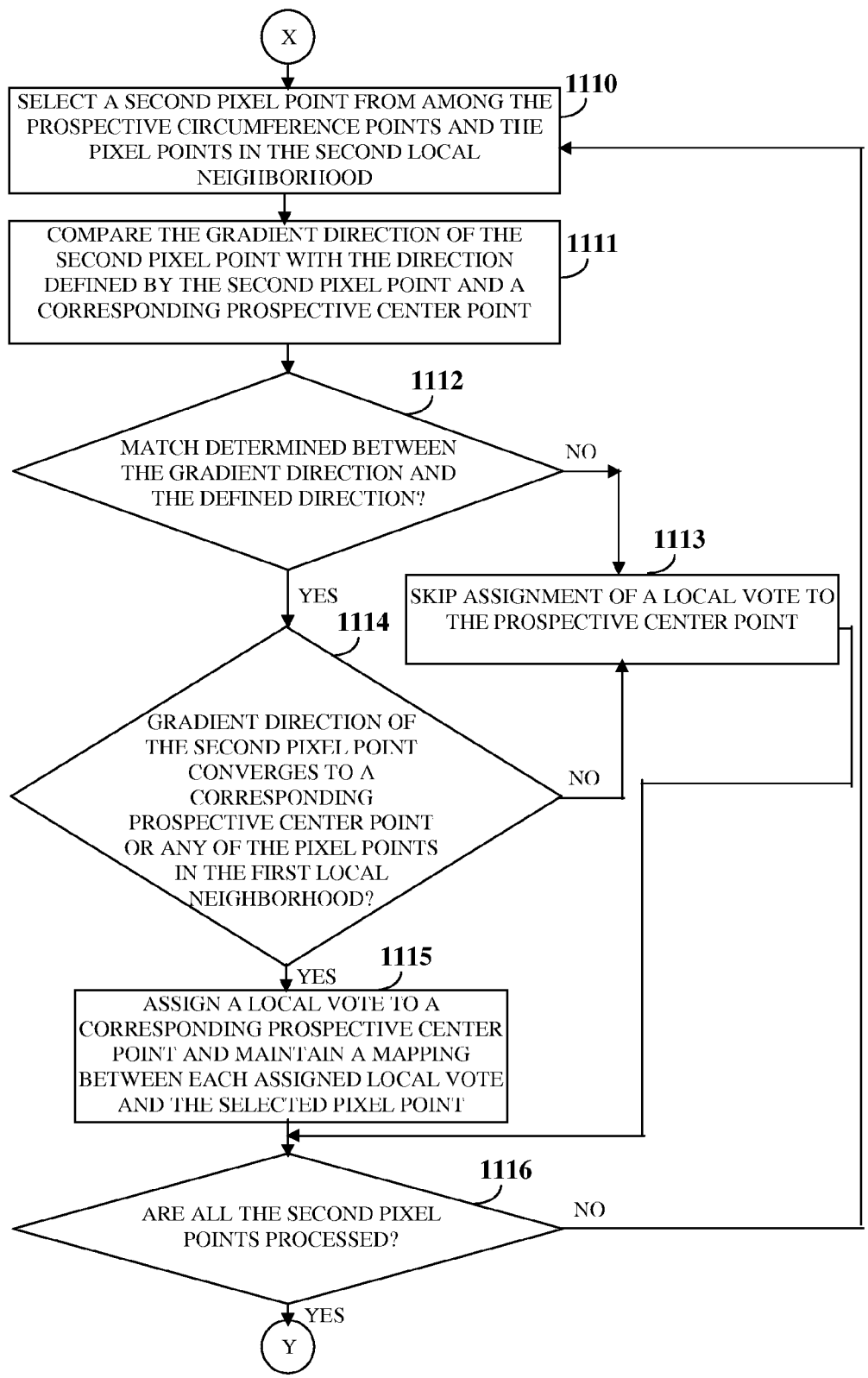
Figure 11C:
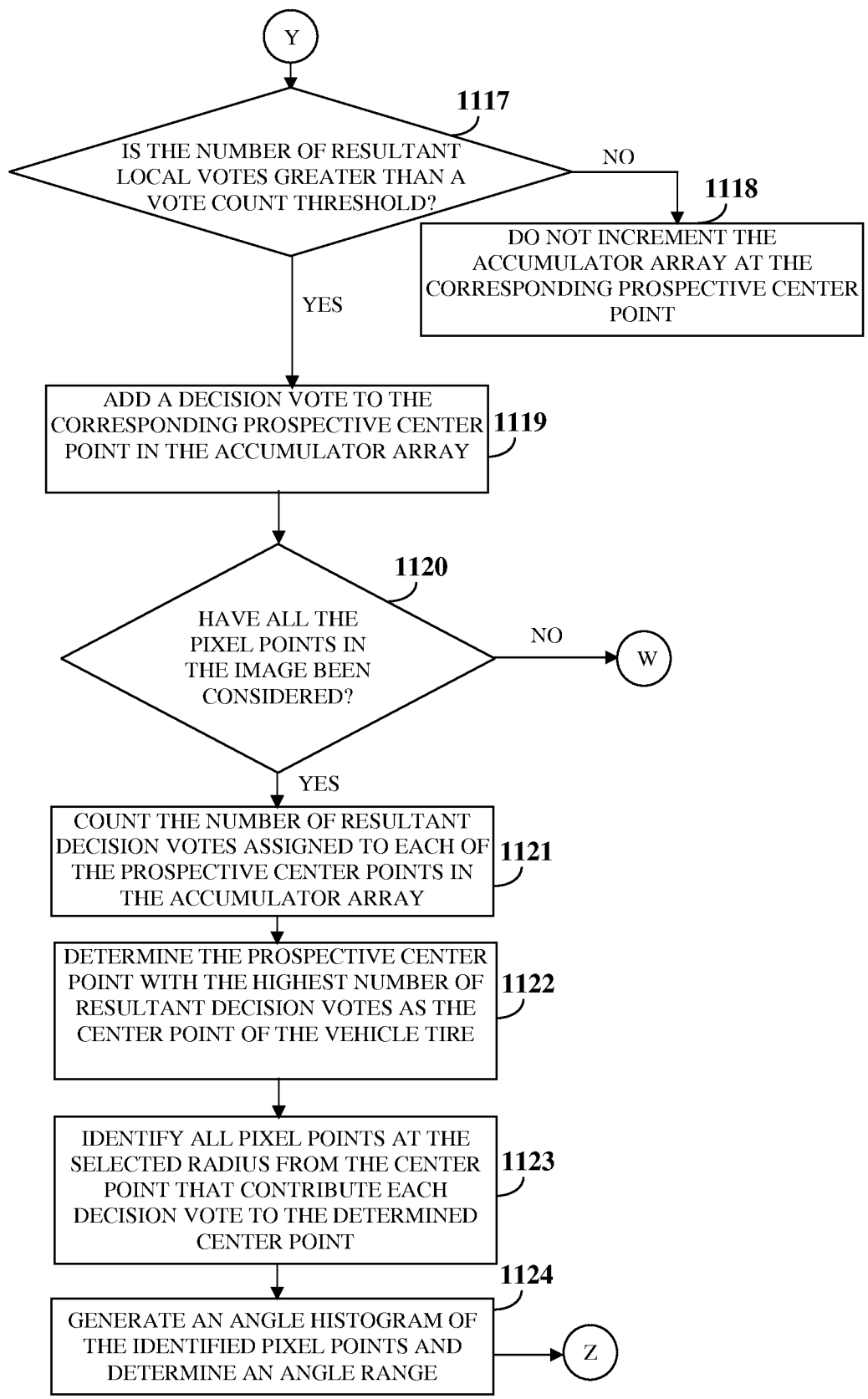
Figure 11D:
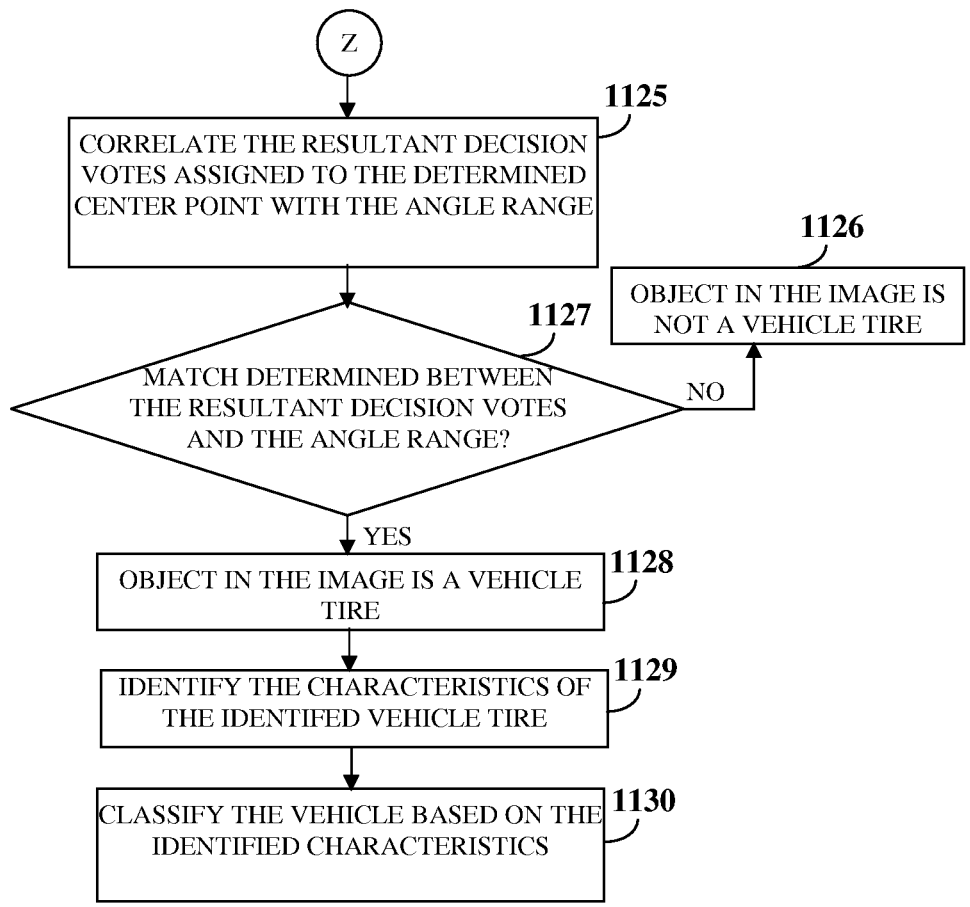

FIG. 10E exemplarily illustrates the distribution of pixel points that characterize a mudguard on the vehicle tire. As exemplarily illustrated in FIG. 10E, the number of pixel points on the upper surface of the vehicle tire is greater than the number of pixel points on the lower surface of the vehicle tire. The circular object identification system identifies the mudguard when the number of pixel points on the upper surface of the vehicle tire is greater than the number of pixel points on the lower surface of the vehicle tire by a predetermined ratio.

FIGS. 11A-11D exemplarily illustrate a flowchart comprising the steps for identifying a circular object in an image. The circular object, in this example, is a vehicle tire. The circular object identification system identifies a vehicle tire in an image using the computer implemented method disclosed herein and analyzes the characteristics of the identified vehicle tire for classifying the type of the vehicle, for example, as a car, a truck, etc. The circular object identification system acquires 1101 one or more images of a vehicle. The images are, for example, captured by an image capture device such as a camera and transmitted to the circular object identification system via a communication link. The circular object identification system first performs 1102 activity detection to detect the presence of the vehicle. The term "activity detection" refers to a method of detecting the presence of a vehicle in an image by monitoring the degree of visual activity in the image. In an example, the circular object identification system monitors a set of consecutive images and records the visual activity in the image. The visual activity in the initial set of images is lower since the image only displays a background with no vehicles. When a vehicle enters the field of view of the camera, the circular object identification system records the activity of the vehicle. Further, the circular object identification system captures the movement of the vehicle leading from one image to another. If the difference in the visual activity measured in terms of a number of pixels, between the initial image frame, that does not include the vehicle, and the subsequent image frames that include the vehicle is greater than a predetermined number of pixels, the circular object identification system marks the object in the image as a vehicle.

The circular object identification system obtains 1103 a spatial representation of the image, comprising an arrangement of pixel points according to the image intensity. The circular object identification system obtains 1104 the gradient direction of each of the pixel points in the image, for example, by applying a Sobel filter. The circular object identification system applies the Sobel filter to the image, and obtains the partial derivatives of the image intensity along the X and Y directions. The circular object identification system derives the gradient angle defining the gradient direction at a particular pixel point in the image by performing an arctan operation on the partial derivatives. The circular object identification system selects 1105 a pixel point in the image to perform further processing. As an example, the circular object identification system selects a pixel point A as exemplarily illustrated in FIG. 5.

The circular object identification system identifies 1106 pixel points at a selected radius from the selected pixel point A along the gradient direction of the selected pixel point A as prospective center points of the vehicle tire. The prospective center points are referred to as G and D in this example. The circular object identification system selects the radius from a set of radius ranges that characterize a particular type of vehicle. For example, since the type of vehicle is unknown, the circular object identification system starts with predetermined radius ranges for two types of vehicles: a car and a truck. Furthermore, the circular object identification system considers different radius ranges for different models of cars and trucks. In this example, the radius range of a car tire is between 20 pixels and 30 pixels. The radius range of a truck tire is, for example, between 90 pixels and 120 pixels. The circular object identification system verifies whether a valid center point of a vehicle tire is identified with each of the radii in the different radius ranges.

The circular object identification system selects 1107 a first local neighborhood of pixel points around each of the prospective center points G and D. The local neighborhood in this example is a 3×3 local neighborhood array of pixel points around each of the prospective center points G and D. The circular object identification system locates 1108 prospective circumference points at predetermined angles at the selected radius from a corresponding prospective center point. The predetermined angle is 15 degrees in this example. The prospective circumference points are B and C with respect to the prospective center point G, and E and F with respect to the prospective center point D.

The circular object identification system selects 1109 a second local neighborhood of pixel points around each of the prospective circumference points B and C, and E and F. Each of the pixel points in the second local neighborhood including the corresponding prospective circumference point is herein referred to as "second pixel points". The circular object identification system then selects 1110 a second pixel point from among the prospective circumference points and the pixel points in the second local neighborhood. The circular object identification system retrieves the gradient direction of each of the second pixel points in the local neighborhood of B and C, and E and F. The circular object identification system compares 1111 the gradient direction of the second pixel point with the direction defined by the second pixel point and a corresponding prospective center point with respect to a reference axis, to find a match. That is, the circular object identification system compares the gradient direction of the second pixel point with the effective angle of the second pixel point with respect to the horizontal reference axis as disclosed in the detailed description of FIG. 1. The effective angle is derived using the predetermined angle.

The circular object identification system checks 1112 whether there is a match between the gradient direction and the defined direction. The circular object identification system verifies, for example, whether the gradient direction of a second pixel point in the second local neighborhood of the prospective circumference point B is along an effective angle equal to about 15 degrees. To accommodate the slight variation in angle arising due to a shift in position of the second pixel points in the second local neighborhood, the circular object identification system varies the effective angle by a predetermined measure and verifies whether the gradient direction of the second pixel point is along a direction derived from incrementing or decrementing the effective angle by the predetermined measure. Furthermore, in order to accommodate the slight variation in the angle corresponding to the gradient direction arising from the use of digital images, the circular object identification system allows variation of the gradient direction by a predetermined angle margin. That is, the circular object identification system verifies whether the gradient direction of the second pixel point is along an effective angle offset by the predetermined angle margin. In this example, the angle margin is 0.5 degrees. Therefore, the circular object identification system finds a match if the gradient direction of B is between 15.5 degrees and 14.5 degrees.

If the circular object identification system determines that there is no match between the gradient direction of the second pixel point and the direction defined by that second pixel point and the corresponding prospective center point with respect to the horizontal reference axis, the circular object identification system skips 1113 the assignment of a local vote to the prospective center point. The circular object identification system then checks 1116 whether all the second pixel points have been processed. If all the second pixel points have been processed, the circular object identification system proceeds to count the resultant number of local votes accumulated by each of the prospective center points. If all the second pixel points have not been processed, the circular object identification system proceeds to select 1110 the next second pixel point and continues with the steps 1111, 1112, 1113, 1114, and 1115. If the circular object identification system determines a match, the circular object identification system proceeds with checking the convergence of the gradient direction of the second pixel point to the corresponding prospective center point or any of the pixel points in the first local neighborhood around the corresponding prospective center point.

In an embodiment, the circular object identification system considers the second pixel points collectively and determines whether a mismatch between the gradient direction of each of the second pixel points and the direction defined by each of the second pixel points and the corresponding prospective center point is greater than a maximum allowed angle mismatch configured by the circular object identification system. If the circular object identification system determines there are at least a minimum number of second pixel points with a mismatch greater than the maximum allowed angle mismatch, the circular object identification system discards the prospective center point. However, if the circular object identification system determines that the mismatch is not enough to establish whether the second pixel points are associated with the prospective center point of the vehicle tire, the circular object identification system proceeds with checking the convergence of the gradient directions of the second pixel points to the corresponding prospective center point or any of the pixel points in the first local neighborhood.

The circular object identification system checks 1114 whether the gradient direction of the second pixel point in the second local neighborhood converges in the first local neighborhood around the corresponding prospective center point G or D. Therefore, the circular object identification system verifies that the second pixel points are associated with either the prospective center point or the pixel points in the local neighborhood around the prospective center point, and that these pixel points are likely to lie either exactly on the circumference of the vehicle tire defined by the prospective center point or in the neighborhood of the circumference of the vehicle tire. If the gradient direction of the second pixel point in the local neighborhood of the prospective circumference point converges to a point in the local neighborhood of G or D, the circular object identification system assigns 1115 a local vote to the prospective center point G or the prospective center point D.

The circular object identification system maintains 1115 a mapping between each local vote and the selected pixel point, that is, the pixel point A, in a lookup table. If the gradient directions of the second pixel point does not converge either in the local neighborhood of G or in the local neighborhood of D, the circular object identification system skips 1113 assignment of a local vote to both the prospective center points. The circular object identification system then checks 1116 whether all the second pixel points have been processed. If all the second pixel points have not been processed, the circular object identification system proceeds to select 1110 the next second pixel point from among each of the prospective circumference points and the pixel points in the second local neighborhood and continues with the steps 1111, 1112, 1113, 1114, and 1115. If all the second pixel points have been processed, the circular object identification system proceeds to count the resultant number of local votes accumulated by each of the prospective center points.

The circular object identification system checks 1117 whether a number of local votes for the prospective center point G or the prospective center point D is greater than a predetermined vote count threshold. The vote count threshold in this example is 9. If the number of resultant local votes is greater than 9, the circular object identification system adds 1119 a decision vote to the corresponding prospective center point in the accumulator array, thereby incrementing the accumulated decision votes of that prospective center point by one. If the number of local votes is lesser than or equal to 9, the circular object identification system does not 1118 increment the accumulator array at the corresponding prospective center point. In this example, the number of local votes accumulated by the prospective center point G is 17, and number of local votes accumulated by the prospective center point D is 9. Since the number of local votes for G is greater than the vote count threshold, the circular object identification system increments the accumulator array at the prospective center point G. Since the number of local votes for D is less than the vote count threshold, the circular object identification system discards the prospective center point D. The circular object identification system verifies 1120 whether all the pixel points in the image have been considered during the execution of the steps 102, 103, 201, 104, 202, 203, 204, and 205 as disclosed in the detailed description of FIG. 2.

The circular object identification system counts 1121 the number of resultant decision votes in the accumulator array for each of the prospective center points. In this example, the circular object identification system determines 1122 the prospective center point with the highest number of accumulated decision votes as the center point of the vehicle tire. In this example, the number of decision votes accumulated by the center point of the vehicle tire is $9/10*pi*R$, where R is the selected radius. The circular object identification system identifies 1123 all the pixel points located at a distance equal to the selected radius from the determined center point that contribute each decision vote to the determined center point. The circular object identification system generates 1124 an angle histogram of the identified pixel points and determines the angle range as disclosed in the detailed description of FIGS. 3A-3B. The circular object identification system plots the angle histogram using the local votes mapped to each of the pixel points against predetermined angle measures at which the corresponding pixel points are located. In this example, the circular object identification system identifies the angle range for the circular object as 300 degrees and the total number of local votes in the angle histogram as 4500.

The circular object identification system correlates 1125 the number of resultant decision votes accumulated for the determined center point with the angle range. The circular object identification system checks 1127 whether there is match between the resultant decision votes and the angle range. If the circular object identification system finds that there is no match between the resultant decision votes and the angle range for the center point of the vehicle tire, the circular object identification system determines 1126 that the circular object in the image is not a vehicle tire.

If there is a match between the resultant decision votes and the angle range, the circular object identification system determines 1128 that the circular object in the image is a vehicle tire. In this example, the circular object identification system correlates the angle range of 300 degrees with the total number of resultant decision votes accumulated by the center point of the vehicle tire, that is, $9/10*pi*R$. Furthermore, the circular object identification system determines that the average number of local votes mapped to the majority of angles in the angle histogram is 4500/300 equal to 15. Considering an angle threshold of 13 votes, the circular object identification system determines that the average number of local votes is greater than the angle threshold; therefore, the circular object in the image is considered to be a vehicle tire. The circular object identification system identifies 1129 the characteristics of the identified vehicle tire. The characteristics comprise, for example, the selected radius for which the circular object identification system identifies a vehicle tire. In this example, the radius for which the circular object identification system identifies the vehicle tire is 30 pixels. Furthermore, the circular object identification system determines the distance between the successive vehicle tires by analyzing an image that captures at least two vehicle tires.

In order to capture a complete image of the vehicle to allow visibility of at least two vehicle tires of the vehicle, the circular object identification system transmits a message to an image acquisition system via a communication link to employ a wider camera angle. The camera is placed, for example, about 50 to 60 meters away from the vehicle. The circular object identification system analyzes a set of image frames that record the activity of the vehicle. The circular object identification system records the first image frame in which the vehicle is sighted. The circular object identification system then configures a frame of reference based on a predetermined coordinate system and the reference coordinates, at which the tracking of the vehicle tires is carried out, for example, the coordinates corresponding to the center point of the frame of reference. The frame of reference is configured for allowing accurate focusing of the vehicle tires. In this example, the reference coordinates for the center point of the vehicle tire is (50, 10). The circular object identification system obtains the coordinates of the center point of the vehicle tire. The circular object identification system tracks the image frames that capture the movement of the vehicle tire through a short distance. For example, the coordinates of the center point of the vehicle tire change linearly as (60, 10), (70, 10), etc.

When the coordinates of the center point of a new vehicle tire are located in the vicinity of (50, 10), for example, at (52, 10), the circular object identification system determines that a new vehicle tire has entered the reference frame. The circular object identification system calculates the distance between the vehicle tires in the image and scales the distance to obtain the actual distance between the vehicle tires. The circular object identification system classifies 1130 the vehicle based on the identified characteristics of the vehicle tires. In this example, the circular object identification system classifies the vehicle as a car since the radius of the vehicle tire and the distance between the vehicle tires matches the characteristics of a car tire.

Figure 12:
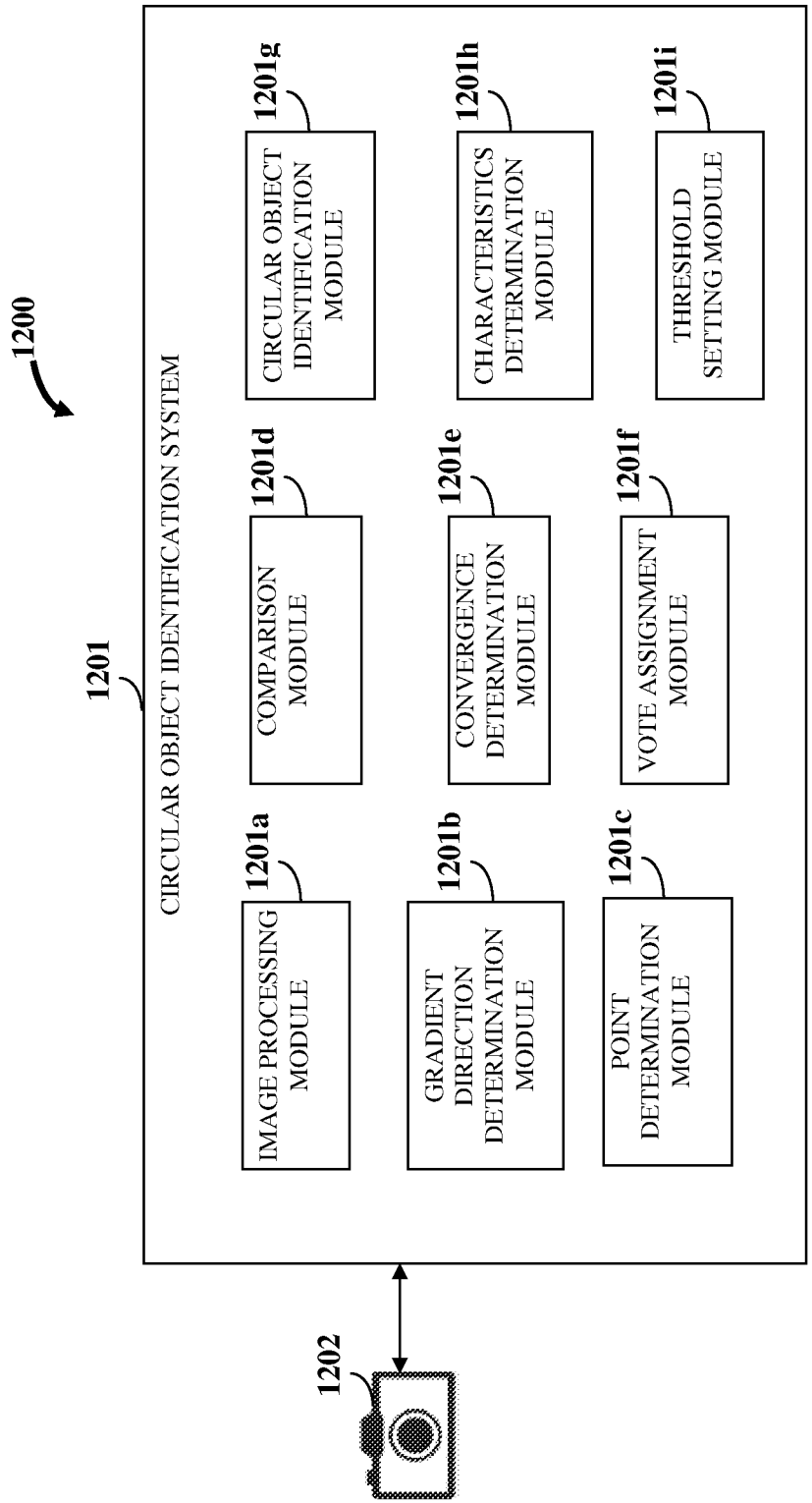
FIG. 12 exemplarily illustrates a computer implemented system for determining a center point of a circular object in an image and for identifying the circular object in the image.

FIG. 12 exemplarily illustrates a computer implemented system 1200 for determining a center point of a circular object in an image and for identifying the circular object in the image. The computer implemented system 1200 disclosed herein comprises a circular object identification system 1201 that processes images comprising one or more circular objects captured by an image capture device 1202, to identify the circular objects in the image. The image capture device 1202 is, for example, a fixed installation camera, a stationary network camera, a camera built into a computing device such as a camera built into a mobile phone, a wireless camera, etc. The circular object identification system 1201 communicates with the image capture device 1202 via a communication link that implements, for example, a Bluetooth® protocol, a protocol implementing Wi-Fi® of the Wireless Ethernet Compatibility Alliance, Inc., a general packet radio service (GPRS) protocol, etc.

The circular object identification system 1201 is hosted on a computing device, for example, a personal computer, a laptop, a mobile phone, a tablet computer, etc. In an example, the circular object identification system 1201 is hosted on a server accessible via a network. The network is, for example, the internet, an intranet, a local area network, a wide area network, a communication network that implements Wi-Fi® of the Wireless Ethernet Compatibility Alliance, Inc., a cellular network, a mobile communication network, etc. In an example, the image capture device 1202 is connected to the computing device hosting the circular object identification system 1201 via a wired interface. In another example, the image capture device 1202 is connected to the computing device hosting the circular object identification system 1201 via a network, for example, a local area network, a wide area network, a wireless network, a communication network implementing Wi-Fi® of the Wireless Ethernet Compatibility Alliance, Inc., a cellular network, a mobile communication network, etc. In another example, the circular object identification system 1201 is directly hosted on the image capture device 1202.

The circular object identification system 1201 comprises a gradient direction determination module 1201b, a point determination module 1201c, a comparison module 1201d, a convergence determination module 1201e, a vote assignment module 1201f, a threshold setting module 1201i, and a circular object identification module 1201g. In an embodiment, the circular object identification system 1201 further comprises an image processing module 1201a that processes the images acquired by the image capture device 1202 for filtering background noise, correcting camera distortion, etc., and generates a spatial representation of the image.

The gradient direction determination module 1201b determines a gradient direction for each of multiple pixel points in the image. The gradient direction defines an angular orientation related to a change in intensity at each of the pixel points with respect to a reference axis. The point determination module 1201c identifies prospective center points of the circular object for each of the pixel points at a predetermined distance, for example, a predetermined radius of the circular object, along the gradient direction of each of the pixel points. In an embodiment, the point determination module 1201c selects the predetermined distance for identifying the prospective center points of the circular object for each of the pixel points from multiple radius ranges defined for the circular object. The point determination module 1201c constructs an axis joining corresponding prospective center points and a corresponding pixel point. The point determination module 1201c locates prospective circumference points among the pixel points at predetermined angles from the constructed axis for the corresponding pixel point, where the prospective circumference points are at the predetermined distance from a corresponding prospective center point.

The comparison module 1201d compares the gradient direction of each of the prospective circumference points with a direction defined by each of the prospective circumference points and a corresponding prospective center point, with respect to the reference axis, to find a match. For example, the comparison module 1201d compares the gradient direction of each of the prospective circumference points with the effective angle of each of the prospective circumference points with respect to the horizontal reference axis, as disclosed in the detailed description of FIG. 1, to find a match. The convergence determination module 1201e determines convergence of the gradient direction of each of the prospective circumference points to a corresponding prospective center point on finding the match, for establishing that each of the prospective circumference points lies on a circumference of the circular object.

The vote assignment module 1201f assigns a decision vote to a corresponding prospective center point based on the determination of the convergence of the gradient direction of each of one or more of the prospective circumference points to the corresponding prospective center point. Furthermore, the vote assignment module 1201f determines the number of resultant decision votes assigned to each of the prospective center points identified for each of the pixel points in the image by counting each decision vote assigned to each of the prospective center points. The vote assignment module 1201f, in communication with the point determination module 1201c and the convergence determination module 1201e, stores each decision vote assigned to the corresponding prospective center point for each of the pixel points in an accumulator array. The point determination module 1201c in communication with the vote assignment module 1201f determines the center point of the circular object from the prospective center points identified for the pixel points in the image based on the determined number of resultant decision votes assigned to each of the prospective center points.

In an embodiment, the point determination module 1201c identifies a first local neighborhood of pixel points around each of the prospective center points, and a second local neighborhood of pixel points around each of the prospective circumference points. In this embodiment, the comparison module 1201d compares the gradient direction of each of the prospective circumference points and each of the pixel points in the second local neighborhood with a direction defined by each of the prospective circumference points and each of the pixel points in the second local neighborhood with a corresponding prospective center point, with respect to the reference axis to find a match, as disclosed in the detailed description of FIGS. 2A-2B. The convergence determination module 1201e, in communication with the comparison module 1201d, determines convergence of the gradient direction of each of the prospective circumference points and each of the pixel points in the second local neighborhood to a corresponding prospective center point or any of the pixel points in the first local neighborhood around the corresponding prospective center point, on finding the match. The convergence determination module 1201e, in communication with the point determination module 1201c, determines convergence of the gradient direction of each of the prospective circumference points and each of the pixel points in the second local neighborhood to a corresponding prospective center point or any of the pixel points in the first local neighborhood around the corresponding prospective center point, by traversing the predetermined distance from each of the prospective circumference points and each of the pixel points in the second local neighborhood to reach the corresponding prospective center point and any of the pixel points in the first local neighborhood.

Furthermore, the vote assignment module 1201f, in communication with the convergence determination module 1201e, assigns a local vote to a corresponding prospective center point based on each determination of the convergence of the gradient direction of each of one or more of the prospective circumference points and the pixel points in the second local neighborhood to the corresponding prospective center point or any of the pixel points in the first local neighborhood. The vote assignment module 1201f adds the decision vote to the corresponding prospective center point in the accumulator array when the number of resultant local votes assigned to the corresponding prospective center point determined by counting each local vote assigned to the corresponding prospective center point is greater than a predetermined vote count threshold. In an embodiment, the vote assignment module 1201f adds the decision vote to each of corresponding prospective center points in the accumulator array, when the resultant local votes assigned to each of the corresponding prospective center points are equal. In another embodiment, the vote assignment module 1201f adds the decision vote to one of the corresponding prospective center points in the accumulator array, when the resultant local votes assigned to the corresponding prospective center point are greater than the resultant local votes assigned to the other prospective center point. The threshold setting module 1201i sets a center threshold for a number of resultant decision votes that qualifies one of the prospective center points as the center point of the circular object.

The circular object identification module 1201g, in communication with the vote assignment module 1201f, determines an angle range that defines a curvature and a magnitude of the circular object, for example, by generating an angle histogram of each of the pixel points identified at the predetermined distance from the determined center point, that contributes each decision vote to the determined center point of the circular object. The circular object identification module 1201g, in communication with the vote assignment module 1201f, correlates the resultant decision votes assigned to the determined center point of the circular object with the angle range determined from the angle histogram for identifying the circular object in the image.

The circular object identification module 1201g, in communication with the vote assignment module 1201f, determines a number of local votes contributed by each of the identified pixel points to the determined center point. The circular object identification module 1201g maps the number of local votes contributed by each of the identified pixel points to a predetermined angle measure for generating the angle histogram. The circular object identification module 1201g determines the angle range using each predetermined angle measure with a non-zero number of local votes. The circular object identification module 1201g compares an average number of local votes for the angle range with a predetermined angle threshold for validating the circular object in the image.

In an embodiment, the point determination module 1201c determines a number of pixel points associated with each of an upper surface and a lower surface of the circular object in the image and compares the number of pixel points associated with the upper surface of the circular object with the number of pixel points associated with the lower surface of the circular object for identifying the type of the circular object. In an embodiment, the circular object identification system 1201 further comprises a characteristics determination module 1201h that determines characteristics of a first circular object and one or more second circular objects associated with the first circular object to classify a device associated with the first circular object and the second circular objects in the image. The characteristics of the first circular object and the second circular objects comprise, for example, one or more of a radius of each of the first circular object and the second circular objects, the number of second circular objects, and a distance between the first circular object and each of the second circular objects. The modules 1201a, 1201b, 1201c, 1201d, 1201e, 1201f, 1201g, 1201h, and 1201i of the circular object identification system 1201 are stored on a non-transitory computer readable storage medium that is communicatively coupled to at least one processor 1301 of a computer system 1300 as disclosed in the detailed description of FIG. 13. The modules 1201a, 1201b, 1201c, 1201d, 1201e, 1201f, 1201g, 1201h, and 1201i of the circular object identification system 1201 are executable by the processor 1301.

Figure 13:
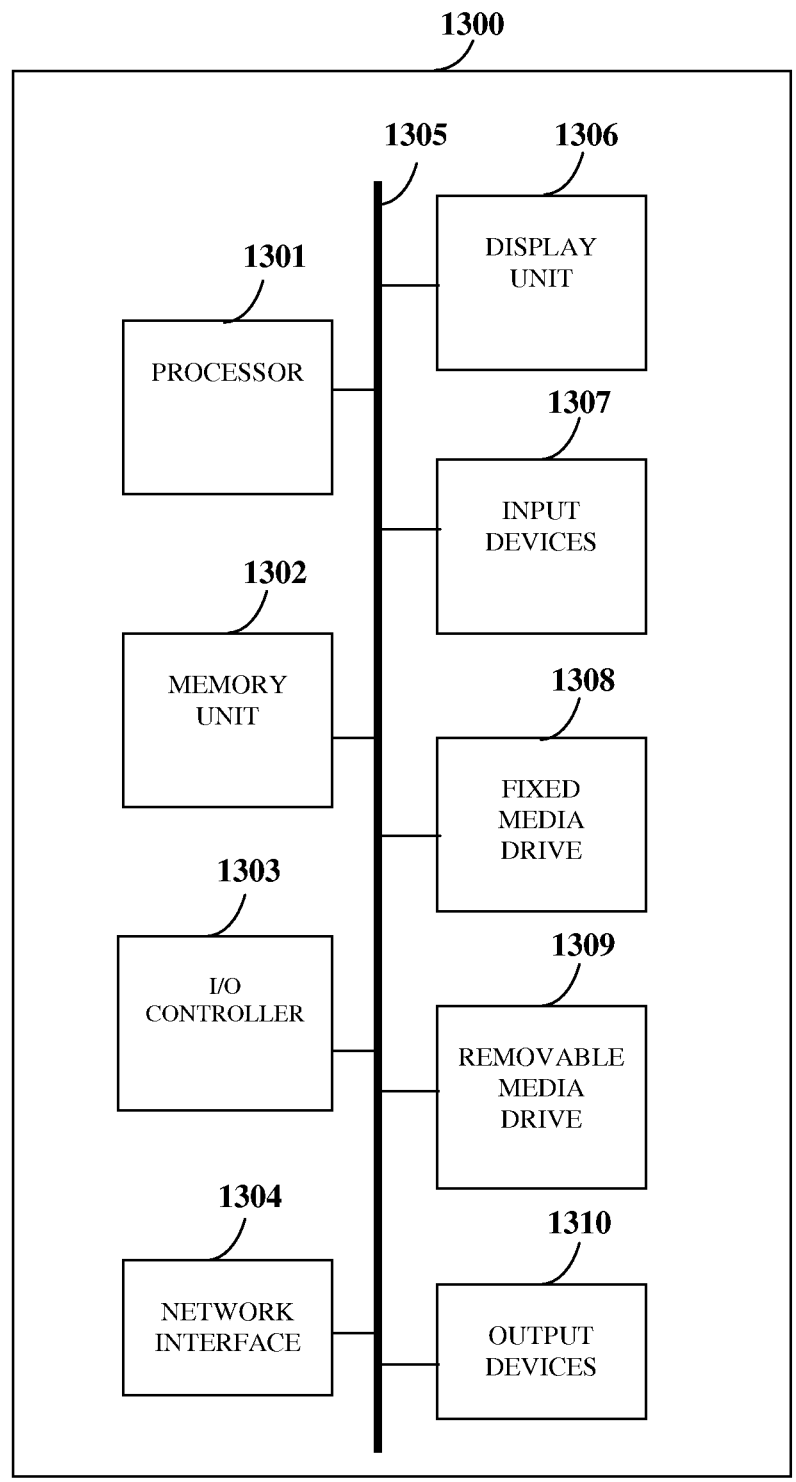
FIG. 13 exemplarily illustrates the architecture of a computer system employed by the circular object identification system for determining a center point of a circular object in an image and for identifying the circular object in the image.

FIG. 13 exemplarily illustrates the architecture of a computer system 1300 employed by the circular object identification system 1201 for determining a center point of a circular object in an image and for identifying the circular object in the image. The circular object identification system 1201 of the computer implemented system 1200 exemplarily illustrated in FIG. 12 employs the architecture of the computer system 1300 exemplarily illustrated in FIG. 13.

The circular object identification system 1201 communicates with an image capture device 1202 via a wired interface or via a communication network, for example, a short range network or a long range network. The communication network is, for example, the internet, a local area network, a wide area network, a wireless network, a mobile communication network, etc. The computer system 1300 comprises, for example, a processor 1301, a memory unit 1302 for storing programs and data, an input/output (I/O) controller 1303, a network interface 1304, a data bus 1305, a display unit 1306, input devices 1307, a fixed media drive 1308, a removable media drive 1309 for receiving removable media, output devices 1310, etc.

The processor 1301 is an electronic circuit that executes computer programs. The memory unit 1302 is used for storing programs, applications, and data. For example, the gradient direction determination module 1201b, the point determination module 1201c, the comparison module 1201d, the convergence determination module 1201e, the vote assignment module 1201f, the threshold setting module 1201i, the circular object identification module 1201g, and the characteristics determination module 1201h of the circular object identification system 1201 are stored in the memory unit 1302 of the computer system 1300 of the circular object identification system 1201. The memory unit 1302 is, for example, a random access memory (RAM) or another type of dynamic storage device that stores information and instructions for execution by the processor 1301. The memory unit 1302 also stores temporary variables and other intermediate information used during execution of the instructions by the processor 1301. The computer system 1300 further comprises a read only memory (ROM) or another type of static storage device that stores static information and instructions for the processor 1301.

The network interface 1304 enables connection of the computer system 1300 to the communication network. For example, the circular object identification system 1201 connects to the communication network via the network interface 1304. The network interface 1304 comprises, for example, an infrared (IR) interface, an interface implementing Wi-Fi® of the Wireless Ethernet Compatibility Alliance, Inc., a universal serial bus (USB) interface, a local area network (LAN) interface, a wide area network (WAN) interface, etc. The I/O controller 1303 controls the input actions and the output actions performed by the circular object identification system 1201. The data bus 1305 permits communications between the modules, for example, 1201a, 1201b, 1201c, 1201d, 1201e, 1201f, 1201g, 1201h, and 1201i of the circular object identification system 1201.

The display unit 1306 of the circular object identification system 1201, via a graphical user interface (GUI), displays information, for example, the angle histogram of the circular object, the coordinates of the center point of the circular object, the pixel distributions of the circular object, etc. The input devices 1307 are used for inputting data into the computer system 1300. A user uses the input devices 1307 to enter the radius ranges of the circular objects, upload the images of the circular objects, etc. The input devices 1307 are, for example, a keyboard such as an alphanumeric keyboard, a joystick, a pointing device such as a computer mouse, a touch pad, a light pen, etc.

The output devices 1310 output the results of operations performed by the circular object identification system 1201. For example, the circular object identification system 1201 displays via a GUI, the characteristics of the circular object determined from the image. For example, the circular object identification system 1201 determines the number of circular objects in the image such as the number of vehicle tires of a vehicle, the distance between a first circular object and a second circular object such as the distance between consecutive vehicle tires, etc.

Computer applications and programs are used for operating the computer system 1300. The programs are loaded onto the fixed media drive 1308 and into the memory unit 1302 of the computer system 1300 via the removable media drive 1309. In an embodiment, the computer applications and programs may be loaded directly via the communication network. Computer applications and programs are executed by double clicking a related icon displayed on the display unit 1306 using one of the input devices 1307.

The computer system 1300 employs an operating system for performing multiple tasks. The operating system is responsible for management and coordination of activities and sharing of resources of the computer system 1300. The operating system further manages security of the computer system 1300, peripheral devices connected to the computer system 1300, and network connections. The operating system employed on the computer system 1300 recognizes, for example, inputs provided by the user using one of the input devices 1307, the output display, files, and directories stored locally on the fixed media drive 1308, for example, a hard drive. The operating system on the computer system 1300 executes different programs using the processor 1301.

The processor 1301 retrieves the instructions for executing the modules, for example, 1201b, 1201c, 1201d, 1201e, 1201f, 1201g, 1201h, and 1201i of the circular object identification system 1201 from the memory unit 1302. A program counter determines the location of the instructions in the memory unit 1302. The program counter stores a number that identifies the current position in the program of each the modules, for example, 1201b, 1201c, 1201d, 1201e, 1201f, 1201g, 1201h, and 1201i of the circular object identification system 1201.

The instructions fetched by the processor 1301 from the memory unit 1302 after being processed are decoded. The instructions are placed in an instruction register in the processor 1301. After processing and decoding, the processor 1301 executes the instructions. For example, the gradient direction determination module 1201b defines instructions for determining a gradient direction for each of multiple pixel points in the image. The point determination module 1201c defines instructions for identifying prospective center points of the circular object for each of the pixel points at a predetermined distance along the gradient direction of each of the pixel points. The point determination module 1201c defines instructions for selecting the predetermined distance for identifying the prospective center points of the circular object for each of the pixel points from multiple radius ranges defined for the circular object. The point determination module 1201c defines instructions for constructing an axis joining corresponding prospective center points and a corresponding pixel point. The point determination module 1201c defines instructions for locating prospective circumference points among the pixel points at predetermined angles from the constructed axis for the corresponding pixel point, where the prospective circumference points are at the predetermined distance from the corresponding prospective center point.

The comparison module 1201d defines instructions for comparing the gradient direction of each of the prospective circumference points with a direction defined by each of the prospective circumference points and a corresponding prospective center point, with respect to a reference axis, to find a match. For example, the comparison module 1201d defines instructions for comparing the gradient direction of each of the prospective circumference points with the effective angle of each of the prospective circumference points with respect to the horizontal reference axis. The convergence determination module 1201e defines instructions for determining convergence of the gradient direction of each of the prospective circumference points to a corresponding prospective center point on finding the match, for establishing that each of the prospective circumference points lies on a circumference of the circular object.

The vote assignment module 1201f defines instructions for assigning a decision vote to a corresponding prospective center point based on the determination of the convergence of the gradient direction of each of one or more prospective circumference points to the corresponding prospective center point. The vote assignment module 1201f defines instructions for storing each decision vote assigned to the corresponding prospective center point for each of the pixel points, in an accumulator array. Furthermore, the vote assignment module 1201f defines instructions for determining the number of resultant decision votes assigned to each of the prospective center points identified for each of the pixel points in the image by counting each decision vote assigned to each of the prospective center points. The point determination module 1201c defines instructions for determining the center point of the circular object from the prospective center points identified for the pixel points in the image based on the determined number of resultant decision votes assigned to each of the prospective center points.

In an embodiment, the point determination module 1201c defines instructions for identifying a first local neighborhood of pixel points around each of the prospective center points, and a second local neighborhood of pixel points around each of the prospective circumference points. In this embodiment, the comparison module 1201d defines instructions for comparing the gradient direction of each of the prospective circumference points and each of the pixel points in the second local neighborhood with a direction defined by each of the prospective circumference points and each of the pixel points in the second local neighborhood with a corresponding prospective center point, with respect to the reference axis to find a match as disclosed in the detailed description of FIGS. 2A-2B.

The convergence determination module 1201e defines instructions for determining convergence of the gradient direction of each of the prospective circumference points and each of the pixel points in the second local neighborhood, to a corresponding prospective center point or any of the pixel points in the first local neighborhood around the corresponding prospective center point on finding the match. The convergence determination module 1201e defines instructions for traversing the predetermined distance from each of the prospective circumference points and each of the pixel points in the second local neighborhood to reach the corresponding prospective center point or any of the pixel points in the first local neighborhood for determining the convergence.

Furthermore, the vote assignment module 1201f defines instructions for assigning a local vote to a corresponding prospective center point based on each determination of convergence of the gradient direction of each of one or more prospective circumference points and the pixel points in the second local neighborhood to the corresponding prospective center point or any of the pixel points in the first local neighborhood. Furthermore, the vote assignment module 1201f defines instructions for adding a decision vote to the corresponding prospective center point in the accumulator array when the number of resultant local votes assigned to a corresponding prospective center point determined by counting each local vote assigned to the corresponding prospective center point is greater than a predetermined vote count threshold. In an embodiment, the vote assignment module 1201f defines instructions for adding the decision vote to each of the corresponding prospective center points in the accumulator array, when the resultant local votes assigned to each of the corresponding prospective center points are equal. In another embodiment, the vote assignment module 1201f defines instructions for adding the decision vote to one of the corresponding prospective center points of the circular object in the accumulator array, when the resultant local votes assigned to the corresponding prospective center point are greater than the resultant local votes assigned to the other prospective center point. The threshold setting module 1201i defines instructions for setting a threshold for a number of resultant decision votes that qualifies the prospective center point as a center point of the circular object.

The circular object identification module 1201g defines instructions for determining an angle range that defines a curvature and a magnitude of the circular object, for example, by generating an angle histogram of each of the pixel points identified at the predetermined distance from the determined center point, that contributes each decision vote to the determined center point of the circular object. The circular object identification module 1201g defines instructions for determining a number of local votes contributed by each of the identified pixel points to the determined center point of the circular object. The circular object identification module 1201g defines instructions for mapping the number of local votes contributed by each of the identified pixel points to a predetermined angle measure, for generating the angle histogram. The circular object identification module 1201g defines instructions for determining the angle range using each predetermined angle measure with a non-zero number of local votes. The circular object identification module 1201g defines instructions for correlating the resultant decision votes assigned to the determined center point of the circular object with the angle range determined from the angle histogram for identifying the circular object in the image. The circular object identification module 1201g defines instructions for comparing an average number of local votes for the angle range with a predetermined angle threshold for validating the circular object in the image.

Furthermore, the point determination module 1201c defines instructions for determining a number of pixel points associated with each of an upper surface and a lower surface of the circular object in the image and for comparing the number of pixel points associated with the upper surface of the circular object with the number of pixel points associated with the lower surface of the circular object for identifying a type of the circular object. The characteristics determination module 1201h defines instructions for determining characteristics of a first circular object and one or more second circular objects associated with the first circular object for classifying a device associated with the first circular object and the second circular objects in the image.

The processor 1301 of the computer system 1300 employed by the circular object identification system 1201 retrieves the instructions defined by the gradient direction determination module 1201b, the point determination module 1201c, the comparison module 1201d, the convergence determination module 1201e, the vote assignment module 1201f, the threshold setting module 1201i, the circular object identification module 1201g, and the characteristics determination module 1201h, and executes the instructions.

At the time of execution, the instructions stored in the instruction register are examined to determine the operations to be performed. The processor 1301 then performs the specified operations. The operations comprise arithmetic operations and logic operations. The operating system performs multiple routines for performing a number of tasks required to assign the input devices 1307, the output devices 1310, and memory for execution of the modules, for example, 1201b,

1201c, 1201d, 1201e, 1201f, 1201g, 1201h, and 1201i of the circular object identification system 1201. The tasks performed by the operating system comprise, for example, assigning memory to the modules, for example, 1201b, 1201c, 1201d, 1201e, 1201f, 1201g, 1201h, and 1201i of the circular object identification system 1201, and to data used by the circular object identification system 1201, moving data between the memory unit 1302 and disk units, and handling input/output operations. The operating system performs the tasks on request by the operations and after performing the tasks, the operating system transfers the execution control back to the processor 1301. The processor 1301 continues the execution to obtain one or more outputs. The outputs of the execution of the modules, for example, 1201b, 1201c, 1201d, 1201e, 1201f, 1201g, 1201h, and 1201i of the circular object identification system 1201 are displayed to the user on the display unit 1306.

Disclosed herein is also a computer program product comprising a non-transitory computer readable storage medium that stores computer program codes comprising instructions executable by at least one processor 1301 for determining a center point of a circular object in an image and for identifying the circular object in the image. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 1301, except for a transitory, propagating signal. The computer program codes comprise a first computer program code for determining a gradient direction for each of multiple pixel points in the image; a second computer program code for identifying prospective center points of the circular object for each of the pixel points at a predetermined distance along the gradient direction of each of the pixel points; a third computer program code for constructing an axis that joins corresponding prospective center points and a corresponding pixel point; a fourth computer program code for locating prospective circumference points among the pixel points at predetermined angles from the constructed axis for the corresponding pixel point, where the prospective circumference points are at the predetermined distance from the corresponding prospective center point; a fifth computer program code for comparing the gradient direction of each of the prospective circumference points with a direction defined by each of the prospective circumference points and a corresponding prospective center point, with respect to a reference axis, to find a match; a sixth computer program code for determining convergence of the gradient direction of each of the prospective circumference points to the corresponding prospective center point on finding the match, for establishing that each of the prospective circumference points lies on a circumference of the circular object; a seventh computer program code for assigning a decision vote to the corresponding prospective center point based on determination of convergence of the gradient direction of each one or more of the prospective circumference points to the corresponding prospective center point; an eighth computer program code for determining number of resultant decision votes assigned to each of the prospective center points identified for each of the pixel points in the image by counting each decision vote assigned to each of the prospective center points; and a ninth computer program code for determining the center point of the circular object from the prospective center points identified for the pixel points in the image, based on the determined number of resultant decision votes assigned to each of the prospective center points.

The computer program product disclosed herein further comprises a tenth computer program code for identifying a first local neighborhood of pixel points around each of the prospective center points and a second local neighborhood of pixel points around each of the prospective circumference points; an eleventh computer program code for determining convergence of the gradient direction of each of the prospective circumference points and each of the pixel points in the second local neighborhood to a corresponding prospective center point or any of the pixel points in the first local neighborhood around the corresponding prospective center point, by traversing the predetermined distance from each of the prospective circumference points and each of the pixel points in the second local neighborhood to reach the corresponding prospective center point or any of the pixel points in the first local neighborhood; a twelfth computer program code for assigning a local vote to the corresponding prospective center point based on each determination of the convergence of the gradient direction of each of the prospective circumference points and each of the pixel points in the second local neighborhood to the corresponding prospective center point or any of the pixel points in the first local neighborhood; and a thirteenth computer program code for adding the decision vote to the corresponding prospective center point in the accumulator array when the number of resultant local votes assigned to the corresponding prospective center point determined by counting each local vote assigned to the corresponding prospective center point is greater than a predetermined vote count threshold.

The computer program product disclosed herein further comprises a fourteenth computer program code for identifying each of the pixel points at the predetermined distance from the determined center point, that contributes each decision vote to the determined center point of the circular object; a fifteenth computer program code for determining an angle range that defines a curvature and a magnitude of the circular object, for example, by generating an angle histogram of each of the identified pixel points; and a sixteenth computer program code for correlating the resultant decision votes assigned to the determined center point of the circular object with the angle range determined from the angle histogram for identifying the circular object in the image. The computer program product disclosed herein further comprises additional computer program codes for performing additional steps that may be required and contemplated for determining a center point of a circular object in an image and for identifying the circular object in the image.

The computer program codes comprising computer executable instructions are embodied on the non-transitory computer readable storage medium. The processor 1301 of the computer system 1300 retrieves these computer executable instructions and executes them. When the computer executable instructions are executed by the processor 1301, the computer executable instructions cause the processor 1301 to perform the steps of the computer implemented method for determining the center point of a circular object and for identifying the circular object in an image. In an embodiment, a single piece of computer program code comprising computer executable instructions performs one or more steps of the computer implemented method disclosed herein for determining the center point of a circular object and for identifying the circular object in an image.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A computer implemented method for determining a center point of a circular object in an image, said method employing a computer system comprising at least one processor communicatively coupled to a non-transitory computer readable storage medium that stores instructions executable by said at least one processor, said at least one processor configured to implement said method, said method comprising:

determining a gradient direction for each of a plurality of pixel points in said image, wherein said gradient direction defines an angular orientation related to a change in intensity at said each of said pixel points with respect to a reference axis;

identifying prospective center points of said circular object for said each of said pixel points at a predetermined distance along said gradient direction of said each of said pixel points, and constructing an axis that joins corresponding said prospective center points and a corresponding pixel point of said each of said pixel points;

locating prospective circumference points among said pixel points at predetermined angles from said constructed axis for said corresponding pixel point, wherein said prospective circumference points are at said predetermined distance from a corresponding one of said prospective center points;

comparing said gradient direction of each of said prospective circumference points with a direction defined by said each of said prospective circumference points and said corresponding one of said prospective center points, with respect to said reference axis to find a match;

determining convergence of said gradient direction of said each of said prospective circumference points to said corresponding one of said prospective center points on finding said match, for establishing that said each of said prospective circumference points lies on a circumference of said circular object;

assigning a decision vote to said corresponding one of said prospective center points based on said determination of said convergence of said gradient direction of each of one or more of said prospective circumference points to said corresponding one of said prospective center points;

determining number of resultant decision votes assigned to each of said prospective center points identified for said each of said pixel points in said image by counting each said decision vote assigned to said each of said prospective center points; and determining said center point of said circular object from said prospective center points identified for said pixel points in said image based on said determined number of said resultant decision votes assigned to said each of said prospective center points.

2. The computer implemented method of claim 1, wherein said determined center point of said circular object is one of said prospective center points with a highest said number of resultant decision votes.

3. The computer implemented method of claim 1, wherein said determined center point of said circular object is one of said prospective center points when a weighted average of said resultant decision votes assigned to said one of said prospective center points is greater than a predetermined threshold.

4. The computer implemented method of claim 1, further comprising storing said each said decision vote assigned to said corresponding one of said prospective center points for said each of said pixel points in an accumulator array, wherein said storage of said each said decision vote assigned to said corresponding one of said prospective center points in said accumulator array comprises:
   identifying a first local neighborhood of said pixel points around said each of said prospective center points;
   identifying a second local neighborhood of said pixel points around said each of said prospective circumference points;
   determining convergence of said gradient direction of said each of said prospective circumference points and each of said pixel points in said second local neighborhood to one of said corresponding one of said prospective center points and any of said pixel points in said first local neighborhood around said corresponding one of said prospective center points, by traversing said predetermined distance from said each of said prospective circumference points and said each of said pixel points in said second local neighborhood to reach said one of said corresponding one of said prospective center points and said any of said pixel points in said first local neighborhood;
   assigning a local vote to said corresponding one of said prospective center points based on each said determination of said convergence of said gradient direction of each of one or more of said prospective circumference points and said pixel points in said second local neighborhood to one of said corresponding one of said prospective center points and said any of said pixel points in said first local neighborhood; and
   adding said decision vote to said corresponding one of said prospective center points in said accumulator array when number of resultant local votes assigned to said corresponding one of said prospective center points determined by counting each said local vote assigned to said corresponding one of said prospective center points is greater than a predetermined vote count threshold.

5. The computer implemented method of claim 4, further comprising comparing said gradient direction of said each of said prospective circumference points and said each of said pixel points in said second local neighborhood with a direction defined by said each of said prospective circumference points and said each of said pixel points in said second local neighborhood with said corresponding one of said prospective center points, with respect to said reference axis to find a match, wherein said convergence of said gradient direction of said each of said prospective circumference points and said each of said pixel points in said second local neighborhood to said one of said corresponding one of said prospective center points and said any of said pixel points in said first local neighborhood around said corresponding one of said prospective center points is determined on finding said match.

6. The computer implemented method of claim 4, wherein said decision vote is added to each of said corresponding said prospective center points in said accumulator array, when said resultant local votes assigned to said each of said corresponding said prospective center points are equal.

7. The computer implemented method of claim 4, wherein said decision vote is added to one of said corresponding said prospective center points in said accumulator array, when said resultant local votes assigned to said one of said corresponding said prospective center points are greater than said resultant local votes assigned to another of said corresponding said prospective center points.

8. The computer implemented method of claim 1, wherein said predetermined distance for identifying said prospective center points of said circular object for said each of said pixel points is selected from a plurality of radius ranges defined for said circular object.

9. The computer implemented method of claim 1, further comprising setting a center threshold for a number of said resultant decision votes that qualifies one of said prospective center points as said center point of said circular object.

10. A computer implemented method for determining a center point of a circular object in an image, said method employing a computer system comprising at least one processor communicatively coupled to a non-transitory computer readable storage medium that stores instructions executable by said at least one processor, said at least one processor configured to implement said method, said method comprising:
   determining a gradient direction for each of a plurality of pixel points in said image, wherein said gradient direction defines an angular orientation related to a change in intensity at said each of said pixel points with respect to a reference axis;
   identifying prospective center points of said circular object for said each of said pixel points at a predetermined distance along said gradient direction of said each of said pixel points, and constructing an axis that joins corresponding said prospective center points and a corresponding pixel point of said each of said pixel points;
   identifying a first local neighborhood of said pixel points around each of said prospective center points;
   locating prospective circumference points among said pixel points at predetermined angles from said constructed axis for said corresponding pixel point, wherein said prospective circumference points are at said predetermined distance from a corresponding one of said prospective center points;
   identifying a second local neighborhood of said pixel points around said each of said prospective circumference points;
   determining convergence of said gradient direction of said each of said prospective circumference points and each of said pixel points in said second local neighborhood to one of said corresponding one of said prospective center points and any of said pixel points in said first local neighborhood around said corresponding one of said prospective center points, by traversing said predetermined distance from said each of said prospective circumference points and said each of said pixel points in said second local neighborhood to reach said one of said corresponding one of said prospective center points and said any of said pixel points in said first local neighborhood;
   assigning a local vote to said corresponding one of said prospective center points based on each said determination of said convergence of said gradient direction of each of one or more of said prospective circumference points and said pixel points in said second local neighborhood to one of said corresponding one of said prospective center points and said any of said pixel points in said first local neighborhood;

adding a decision vote to said corresponding one of said prospective center points in an accumulator array when number of resultant local votes assigned to said corresponding one of said prospective center points determined by counting each said local vote assigned to said corresponding one of said prospective center points is greater than a predetermined vote count threshold;

determining number of resultant decision votes assigned to each of said prospective center points identified for said each of said pixel points in said image by counting each said decision vote assigned to said each of said prospective center points; and determining said center point of said circular object from said prospective center points identified for said pixel points in said image based on said determined number of said resultant decision votes assigned to said each of said prospective center points.

11. The computer implemented method of claim 10, further comprising comparing said gradient direction of said each of said prospective circumference points and said each of said pixel points in said second local neighborhood with a direction defined by said each of said prospective circumference points and said each of said pixel points in said second local neighborhood with said corresponding one of said prospective center points, with respect to said reference axis to find a match, wherein said convergence of said gradient direction of said each of said prospective circumference points and said each of said pixel points in said second local neighborhood to said one of said corresponding one of said prospective center points and said any of said pixel points in said first local neighborhood around said corresponding one of said prospective center points is determined on finding said match.

12. The computer implemented method of claim 10, wherein said determined center point of said circular object is one of said prospective center points with a highest said number of said resultant decision votes.

13. The computer implemented method of claim 10, wherein said determined center point of said circular object is one of said prospective center points when a weighted average of said resultant decision votes assigned to said one of said prospective center points is greater than a predetermined threshold.

14. The computer implemented method of claim 10, wherein said decision vote is added to each of said corresponding said prospective center points in said accumulator array, when said resultant local votes assigned to said each of said corresponding said prospective center points are equal.

15. The computer implemented method of claim 10, wherein said decision vote is added to one of said corresponding said prospective center points in said accumulator array, when said resultant local votes assigned to said one of said corresponding said prospective center points are greater than said resultant local votes assigned to another of said corresponding said prospective center points.

16. A computer implemented method for identifying a circular object in an image, said method employing a computer system comprising at least one processor communicatively coupled to a non-transitory computer readable storage medium that stores instructions executable by said at least one processor, said at least one processor configured to implement said method, said method comprising:

determining a gradient direction for each of a plurality of pixel points in said image, wherein said gradient direction defines an angular orientation related to a change in intensity at said each of said pixel points with respect to a reference axis;

identifying prospective center points of said circular object for said each of said pixel points at a predetermined distance along said gradient direction of said each of said pixel points, and constructing an axis that joins corresponding said prospective center points and a corresponding pixel point of said each of said pixel points;

locating prospective circumference points among said pixel points at predetermined angles from said constructed axis for said corresponding pixel point, wherein said prospective circumference points are at said predetermined distance from a corresponding one of said prospective center points;

comparing said gradient direction of each of said prospective circumference points with a direction defined by said each of said prospective circumference points and said corresponding one of said prospective center points, with respect to said reference axis to find a match;

determining convergence of said gradient direction of said each of said prospective circumference points to said corresponding one of said prospective center points on finding said match, for establishing that said each of said prospective circumference points lies on a circumference of said circular object;

assigning a decision vote to said corresponding one of said prospective center points based on said determination of said convergence of said gradient direction of each of one or more of said prospective circumference points to said corresponding one of said prospective center points;

determining number of resultant decision votes assigned to each of said prospective center points identified for said each of said pixel points in said image by counting each said decision vote assigned to said each of said prospective center points;

determining said center point of said circular object from said prospective center points identified for said pixel points in said image based on said determined number of said resultant decision votes assigned to said each of said prospective center points;

identifying each of said pixel points at said predetermined distance from said determined center point, that contributes each said decision vote to said determined center point of said circular object;

determining an angle range that defines a curvature and a magnitude of said circular object by generating an angle histogram of said identified each of said pixel points; and correlating said resultant decision votes assigned to said determined center point of said circular object with said angle range determined from said angle histogram for identifying said circular object in said image.

17. The computer implemented method of claim 16, further comprising storing said each said decision vote assigned to said corresponding one of said prospective center points for said each of said pixel points in an accumulator array, wherein said storage of said each said decision vote assigned to said corresponding one of said prospective center points in said accumulator array comprises:

identifying a first local neighborhood of said pixel points around said each of said prospective center points;

identifying a second local neighborhood of said pixel points around said each of said prospective circumference points;

determining convergence of said gradient direction of said each of said prospective circumference points and each of said pixel points in said second local neighborhood to one of said corresponding one of said prospective center points and any of said pixel points in said first local neighborhood around said corresponding one of said prospective center points, by traversing said predetermined distance from said each of said prospective circumference points and said each of said pixel points in said second local neighborhood to reach said one of said corresponding one of said prospective center points and said any of said pixel points in said first local neighborhood;

assigning a local vote to said corresponding one of said prospective center points based on each said determination of said convergence of said gradient direction of each of one or more of said prospective circumference points and said pixel points in said second local neighborhood to one of said corresponding one of said prospective center points and said any of said pixel points in said first local neighborhood; and adding said decision vote to said corresponding one of said prospective center points in said accumulator array when number of resultant local votes assigned to said corresponding one of said prospective center points determined by counting each said local vote assigned to said corresponding one of said prospective center points is greater than a predetermined vote count threshold.

18. The computer implemented method of claim 17, further comprising comparing said gradient direction of said each of said prospective circumference points and said each of said pixel points in said second local neighborhood with a direction defined by said each of said prospective circumference points and said each of said pixel points in said second local neighborhood with said corresponding one of said prospective center points, with respect to said reference axis to find a match, wherein said convergence of said gradient direction of said each of said prospective circumference points and said each of said pixel points in said second local neighborhood to said one of said corresponding one of said prospective center points and said any of said pixel points in said first local neighborhood around said corresponding one of said prospective center points is determined on finding said match.

19. The computer implemented method of claim 16, wherein said determination of said angle range comprises:
determining a number of local votes contributed by said identified each of said pixel points to said determined center point;
mapping said number of said local votes contributed by said identified each of said pixel points to a predetermined angle measure; and
determining said angle range using each said predetermined angle measure with a non-zero number of said local votes.

20. The computer implemented method of claim 19, further comprising comparing an average number of said local votes for said angle range with a predetermined angle threshold for validating said circular object in said image.

21. The computer implemented method of claim 16, wherein said curvature of said circular object determines a type of said circular object based on said angle range.

22. The computer implemented method of claim 16, further comprising determining a number of said pixel points associated with each of an upper surface and a lower surface of said circular object in said image and comparing said number of said pixel points associated with said upper surface of said circular object with said number of said pixel points associated with said lower surface of said circular object for identifying a type of said circular object.

23. The computer implemented method of claim 16, further comprising determining characteristics of a first said circular object and one or more second circular objects associated with said first said circular object to classify a device associated with said first said circular object and said one or more second circular objects in said image.

24. The computer implemented method of claim 23, wherein said characteristics of said first said circular object and said one or more second circular objects comprise one or more of a radius of each of said first said circular object and said one or more second circular objects, a number of said one or more second circular objects, and a distance between said first said circular object and each of said one or more second circular objects.

25. A computer implemented system for determining a center point of a circular object in an image, comprising:
at least one processor;
a non-transitory computer readable storage medium communicatively coupled to said at least one processor, said non-transitory computer readable storage medium storing modules of said computer implemented system that are executable by said at least one processor, said modules comprising:
a gradient direction determination module that determines a gradient direction for each of a plurality of pixel points in said image, wherein said gradient direction defines an angular orientation related to a change in intensity at said each of said pixel points with respect to a reference axis;
a point determination module that performs:
identifying prospective center points of said circular object for said each of said pixel points at a predetermined distance along said gradient direction of said each of said pixel points;
constructing an axis joining corresponding said prospective center points and a corresponding pixel point of said each of said pixel points; and
locating prospective circumference points among said pixel points at predetermined angles from said constructed axis for said corresponding pixel point, wherein said prospective circumference points are at said predetermined distance from a corresponding one of said prospective center points;
a comparison module that compares said gradient direction of each of said prospective circumference points with a direction defined by said each of said prospective circumference points and said corresponding one of said prospective center points, with respect to said reference axis to find a match;
a convergence determination module that determines convergence of said gradient direction of said each of said prospective circumference points to said corresponding one of said prospective center points on finding said match, for establishing that said each of said prospective circumference points lies on a circumference of said circular object;
a vote assignment module that assigns a decision vote to said corresponding one of said prospective center points based on said determination of said convergence of said gradient direction of said each of one or more of said prospective circumference points to said corresponding one of said prospective center points;
said vote assignment module that determines number of resultant decision votes assigned to each of said prospective center points identified for said each of said pixel points in said image by counting each said decision vote assigned to said each of said prospective center points; and said point determination module in communication with said vote assignment module that determines said center point of said circular object from said prospective center points identified for said pixel points in said image based on said determined number of said resultant decision votes assigned to said each of said prospective center points.

26. The computer implemented system of claim 25, wherein said vote assignment module, in communication with said point determination module and said convergence determination module, stores said each said decision vote assigned to said corresponding one of said prospective center points for said each of said pixel points in an accumulator array.

27. The computer implemented system of claim 25, wherein said point determination module identifies a first local neighborhood of said pixel points around said each of said prospective center points, and a second local neighborhood of said pixel points around said each of said prospective circumference points.

28. The computer implemented system of claim 27, wherein said convergence determination module, in communication with said point determination module, determines convergence of said gradient direction of said each of said prospective circumference points and each of said pixel points in said second local neighborhood to one of said corresponding one of said prospective center points and any of said pixel points in said first local neighborhood around said corresponding one of said prospective center points, by traversing said predetermined distance from said each of said prospective circumference points and said each of said pixel points in said second local neighborhood to reach said one of said corresponding one of said prospective center points and said any of said pixel points in said first local neighborhood.

29. The computer implemented system of claim 28, wherein said comparison module compares said gradient direction of said each of said prospective circumference points and said each of said pixel points in said second local neighborhood with a direction defined by said each of said prospective circumference points and said each of said pixel points in said second local neighborhood with said corresponding one of said prospective center points, with respect to said reference axis to find a match, and wherein said convergence determination module, in communication with said comparison module, determines said convergence of said gradient direction of said each of said prospective circumference points and said each of said pixel points in said second local neighborhood to said one of said corresponding one of said prospective center points and said any of said pixel points in said first local neighborhood around said corresponding one of said prospective center points, on finding said match.

30. The computer implemented system of claim 28, wherein said vote assignment module, in communication with said convergence determination module, performs:

assigning a local vote to said corresponding one of said prospective center points based on each said determination of said convergence of said gradient direction of each of one or more of said prospective circumference points and said pixel points in said second local neighborhood to one of said corresponding one of said prospective center points and said any of said pixel points in said first local neighborhood; and adding said decision vote to said corresponding one of said prospective center points in said accumulator array when number of resultant local votes assigned to said corresponding one of said prospective center points determined by counting each said local vote assigned to said corresponding one of said prospective center points is greater than a predetermined vote count threshold.

31. The computer implemented system of claim 30, wherein said vote assignment module adds said decision vote to each of said corresponding said prospective center points in said accumulator array, when said resultant local votes assigned to said each of said corresponding said prospective center points are equal.

32. The computer implemented system of claim 30, wherein said vote assignment module adds said decision vote to one of said corresponding said prospective center points in said accumulator array, when said resultant local votes assigned to said one of said corresponding said prospective center points are greater than said resultant local votes assigned to another of said corresponding said prospective center points.

33. The computer implemented system of claim 25, wherein said modules further comprises a threshold setting module that sets a center threshold for a number of said resultant decision votes that qualifies one of said prospective center points as said center point of said circular object.

34. The computer implemented system of claim 25, wherein said point determination module selects said predetermined distance for identifying said prospective center points of said circular object for said each of said pixel points from a plurality of radius ranges defined for said circular object.

35. The computer implemented system of claim 25, wherein said modules further comprise a circular object identification module, in communication with said vote assignment module, that performs:

determining an angle range that defines a curvature and a magnitude of said circular object by generating an angle histogram of each of said pixel points identified at said predetermined distance from said determined center point, that contributes each said decision vote to said determined center point of said circular object; and correlating said resultant decision votes assigned to said determined center point of said circular object with said angle range determined from said angle histogram for identifying said circular object in said image.

36. The computer implemented system of claim 35, wherein said circular object identification module, in communication with said vote assignment module, performs:

determining a number of local votes contributed by said identified each of said pixel points to said determined center point;

mapping said number of said local votes contributed by said identified each of said pixel points to a predetermined angle measure;

determining said angle range using each said predetermined angle measure with a non-zero number of said local votes; and comparing an average number of said local votes for said angle range with a predetermined angle threshold for validating said circular object in said image.

37. The computer implemented system of claim 25, wherein said point determination module determines a number of said pixel points associated with each of an upper surface and a lower surface of said circular object in said image and compares said number of said pixel points associated with said upper surface of said circular object with said number of said pixel points associated with said lower surface of said circular object for identifying a type of said circular object.

38. The computer implemented system of claim 25, wherein said modules further comprise a characteristics determination module that determines characteristics of a first said circular object and one or more second circular objects associated with said first said circular object to classify a device associated with said first said circular object and said one or more second circular objects in said image, wherein said characteristics of said first said circular object and said one or more second circular objects comprise one or more of a radius of each of said first said circular object and said one or more second circular objects, a number of said one or more second circular objects, and a distance between said first said circular object and each of said one or more second circular objects.

39. A computer program product comprising a non-transitory computer readable storage medium, said non-transitory computer readable storage medium storing computer program codes comprising instructions executable by at least one processor, said computer program codes comprising:
- a first computer program code for determining a gradient direction for each of a plurality of pixel points in an image, wherein said gradient direction defines an angular orientation related to a change in intensity at said each of said pixel points with respect to a reference axis;
- a second computer program code for identifying prospective center points of a circular object for said each of said pixel points at a predetermined distance along said gradient direction of said each of said pixel points;
- a third computer program code for constructing an axis that joins corresponding said prospective center points and a corresponding pixel point of said each of said pixel points;
- a fourth computer program code for locating prospective circumference points among said pixel points at predetermined angles from said constructed axis for said corresponding pixel point, wherein said prospective circumference points are at said predetermined distance from a corresponding one of said prospective center points;
- a fifth computer program code for comparing said gradient direction of each of said prospective circumference points with a direction defined by said each of said prospective circumference points and said corresponding one of said prospective center points, with respect to said reference axis to find a match;
- a sixth computer program code for determining convergence of said gradient direction of said each of said prospective circumference points to said corresponding one of said prospective center points on finding said match, for establishing that said each of said prospective circumference points lies on a circumference of said circular object;
- a seventh computer program code for assigning a decision vote to said corresponding one of said prospective center points based on said determination of said convergence of said gradient direction of each of one or more of said prospective circumference points to said corresponding one of said prospective center points;
- an eighth computer program code for determining number of resultant decision votes assigned to each of said prospective center points identified for said each of said pixel points in said image by counting each said decision vote assigned to said each of said prospective center points; and
- a ninth computer program code for determining said center point of said circular object from said prospective center points identified for said pixel points in said image based on said determined number of said resultant decision votes assigned to said each of said prospective center points.

40. The computer program product of claim 39, further comprising:
- a tenth computer program code for identifying a first local neighborhood of said pixel points around said each of said prospective center points and a second local neighborhood of said pixel points around said each of said prospective circumference points;
- an eleventh computer program code for determining convergence of said gradient direction of said each of said prospective circumference points and each of said pixel points in said second local neighborhood to one of a corresponding one of said prospective center points and any of said pixel points in said first local neighborhood around said corresponding one of said prospective center points, by traversing said predetermined distance from said each of said prospective circumference points and said each of said pixel points in said second local neighborhood to reach said one of said corresponding one of said prospective center points and said any of said pixel points in said first local neighborhood;
- a twelfth computer program code for assigning a local vote to said corresponding one of said prospective center points based on each said determination of said convergence of said gradient direction of each of one or more of said prospective circumference points and said pixel points in said second local neighborhood to one of said corresponding one of said prospective center points and said any of said pixel points in said first local neighborhood; and
- a thirteenth computer program code for adding said decision vote to said corresponding one of said prospective center points in said accumulator array when number of resultant local votes assigned to said corresponding one of said prospective center points determined by counting each said local vote assigned to said corresponding one of said prospective center points is greater than a predetermined vote count threshold.

41. The computer program product of claim 39, further comprising:
- a fourteenth computer program code for identifying each of said pixel points at said predetermined distance from said determined center point, that contributes each said decision vote to said determined center point of said circular object;
- a fifteenth computer program code for determining an angle range that defines a curvature and a magnitude of said circular object by generating an angle histogram of said identified each of said pixel points; and
- a sixteenth computer program code for correlating said resultant decision votes assigned to said determined center point of said circular object with said angle range determined from said angle histogram for identifying said circular object in said image.

\* \* \* \* \*